United States Patent
He et al.

(10) Patent No.: US 11,765,733 B2
(45) Date of Patent: Sep. 19, 2023

(54) TECHNIQUES FOR MEASUREMENT GAP CONFIGURATIONS

(71) Applicant: QUALCOMM Incorporated, San Diego, CA (US)

(72) Inventors: Qunfeng He, San Diego, CA (US); Carlos Cabrera Mercader, Cardiff, CA (US); Peter Pui Lok Ang, San Diego, CA (US); Arvind Vardarajan Santhanam, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/219,447

(22) Filed: Mar. 31, 2021

(65) Prior Publication Data
US 2022/0322308 A1 Oct. 6, 2022

(51) Int. Cl.
*H04W 72/23* (2023.01)
*H04L 41/0896* (2022.01)
(Continued)

(52) U.S. Cl.
CPC ......... *H04W 72/23* (2023.01); *H04L 41/0896* (2013.01); *H04W 24/08* (2013.01); *H04W 72/0453* (2013.01)

(58) Field of Classification Search
CPC ........... H04W 72/085; H04W 72/0453; H04W 72/044; H04W 24/02; H04W 24/04; H04W 24/08; H04W 24/10; H04W 72/23
See application file for complete search history.

(56) References Cited

U.S. PATENT DOCUMENTS

| | | | |
|---|---|---|---|
| 2019/0059093 A1* | 2/2019 | Cheng | H04W 72/085 |
| 2019/0215048 A1* | 7/2019 | Cirik | H04W 24/08 |

(Continued)

FOREIGN PATENT DOCUMENTS

| | | |
|---|---|---|
| WO | WO-2019092943 A1 | 5/2019 |
| WO | WO-2020248261 A1 | 12/2020 |

OTHER PUBLICATIONS

Apple: "Consideration on Preconfigured Measurement Gap Patterns", 3GPP TSG-RAN4 Meeting #98-e, 3GPP Draft, R4-2100221,3rd Generation Partnership Project (3GPP), Mobile Competence Centre, 650, Route Des Lucioles, F-06921 Sophia-Antipolis Cedex, France, vol. RAN WG4, No. Online, 20210125-20210205, Jan. 15, 2021 (Jan. 15, 2021), 5 Pages, XP051969384, Retrieved from the Internet: URL: https://ftp.3gpp.org/tsg_ran/WG4_Radio/TSGR4_98_e/Docs/R4-2100221 .zip, R4-2100221 Consideration on preconfigured measurement gap patterns.docx [retrieved on Jan. 15, 2021], The whole document.

(Continued)

*Primary Examiner* — Chi Ho A Lee
*Assistant Examiner* — Andrew Lee
(74) *Attorney, Agent, or Firm* — Holland & Hart LLP

(57) ABSTRACT

Methods, systems, and devices for wireless communications are described. A user equipment (UE) may receive, from a base station, control signaling including an indication of a first measurement gap configuration associated with a first bandwidth part (BWP) and associated with measurements for communications at the UE over a frequency outside of the first BWP in a frequency domain. The UE may receive, from the base station, a downlink message including an indication of the first BWP. The UE may then communicate with the base station during a first time interval based on the indication of the first measurement gap configuration and the indication of the first BWP.

28 Claims, 15 Drawing Sheets

(51) Int. Cl.
*H04W 24/08* (2009.01)
*H04W 72/0453* (2023.01)

(56) References Cited

U.S. PATENT DOCUMENTS

| | | | | |
|---|---|---|---|---|
| 2019/0363809 | A1* | 11/2019 | Yoon | H04W 24/08 |
| 2020/0204332 | A1* | 6/2020 | Da | H04W 24/02 |
| 2020/0213066 | A1* | 7/2020 | Ma | H04W 24/02 |
| 2020/0288337 | A1* | 9/2020 | Callender | H04W 24/10 |
| 2020/0344019 | A1* | 10/2020 | Da Silva | H04W 24/04 |
| 2021/0112508 | A1* | 4/2021 | Xiang | H04W 24/10 |
| 2021/0329652 | A1* | 10/2021 | Li | H04L 5/0048 |
| 2021/0345148 | A1* | 11/2021 | Lin | H04W 72/0453 |
| 2021/0385681 | A1* | 12/2021 | Li | H04W 72/044 |
| 2022/0104059 | A1 | 3/2022 | Hu et al. | |
| 2022/0256519 | A1* | 8/2022 | Jeon | H04W 72/044 |

OTHER PUBLICATIONS

Ericsson: "Configuration of Measurement Gap in NR", 3GPP TSG-RAN WG2 #100, 3GPP Draft, R2-1713737—Measurement Gap Configuration in NR, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 17, 2017 (Nov. 17, 2017), pp. 1-3, XP051372395, Retrieved from the Internet: URL: https://www.3gpp.org/ftp/tsg_ran/WG2_RL2/TSGR2_100/Docs/, [retrieved on Nov. 17, 2017],The whole document.

International Search Report and Written Opinion—PCT/US2022/070808—ISA/EPO—dated Jun. 2, 2022.

Qualcomm Incorporated: "On Pre-Configured Measurement Gaps", 3GPP TSG-RAN WG4 Meeting #101-bis-e, 3GPP Draft, R4-2200761, 3rd Generation Partnership Project (3GPP), Mobile Competence Centre, 650, Route Des Lucioles, F-06921 Sophia-Antipolis Cedex, France, vol. RAN WG4, No. Online Meeting, 20220117-20220125, Jan. 10, 2022 (Jan. 10, 2022), pp. 1-8, XP052094916, Retrieved from the Internet: URL: https://ftp.3gpp.org/tsg_ran/WG4_Radio/TSGR4_101-bis-e/Docs/R4-2200761.zip, R4-2200761—On pre-configured MG.docx [retrieved on Jan. 10, 2022], The whole document.

Xiaomi: "Discussion on Measurement Gap Enhancement for NR", 3GPP TSG-RAN4 Meeting #98e, 3GPP Draft, R4-2100712, 3rd Generation Partnership Project (3GPP), Mobile Competence Centre, 650, Route Des Lucioles, F-06921 Sophia-Antipolis Cedex, France, vol. RAN WG4, No. E-meeting, 20210125-20210205, Jan. 15, 2021 (Jan. 15, 2021), XP051969752, Retrieved from the Internet: URL: https://ftp.3gpp.org/tsg_ran/WG4_Radio/TSGR4_98_e/Docs/R4-2100712.zip R4-2100712 Discussion on pre-configured measurement gap for NR.docx [retrieved on Jan. 15, 2021], The whole document.

* cited by examiner

TECHNIQUES FOR MEASUREMENT GAP CONFIGURATIONS

FIELD OF TECHNOLOGY

The following relates to wireless communications, including techniques for measurement gap configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for measurement gap configurations. Generally, the present disclosure provides techniques for configuring a user equipment (UE) with multiple measurement gap configurations. In particular, techniques described herein enable a UE to be configured with a set of measurement gap configurations on a per-bandwidth part (BWP) basis. For example, a UE may be configured with a set of measurement gap configurations, where each measurement gap configuration is associated with a respective BWP for communications at the UE. In some cases, the UE may be pre-configured with the set of measurement gap configurations and signaling from the base station may indicate which pre-configured measurement gap configuration to use. Additionally, or alternatively, the set of measurement gap configurations (and mappings to associated BWPs) may themselves be signaled via signaling, such as radio resource control (RRC) signaling. The UE may then receive an indication to perform communications within a respective BWP, and the UE may perform communications within the indicated BWP and in accordance with a measurement gap configuration associated with the respective BWP.

A method for wireless communication at a UE is described. The method may include receiving, from a base station, control signaling including an indication of a first measurement gap configuration associated with a first BWP and associated with measurements for communications at the UE over a frequency outside of the first BWP in a frequency domain, receiving, from the base station, a downlink message including an indication of the first BWP, and communicating with the base station during a first time interval based on the indication of the first measurement gap configuration and the indication of the first BWP.

An apparatus for wireless communication at a UE is described. The apparatus may include a processor, memory coupled with the processor, and instructions stored in the memory. The instructions may be executable by the processor to cause the apparatus to receive, from a base station, control signaling including an indication of a first measurement gap configuration associated with a first BWP and associated with measurements for communications at the UE over a frequency outside of the first BWP in a frequency domain, receive, from the base station, a downlink message including an indication of the first BWP, and communicate with the base station during a first time interval based on the indication of the first measurement gap configuration and the indication of the first BWP.

Another apparatus for wireless communication at a UE is described. The apparatus may include means for receiving, from a base station, control signaling including an indication of a first measurement gap configuration associated with a first BWP and associated with measurements for communications at the UE over a frequency outside of the first BWP in a frequency domain, means for receiving, from the base station, a downlink message including an indication of the first BWP, and means for communicating with the base station during a first time interval based on the indication of the first measurement gap configuration and the indication of the first BWP.

A non-transitory computer-readable medium storing code for wireless communication at a UE is described. The code may include instructions executable by a processor to receive, from a base station, control signaling including an indication of a first measurement gap configuration associated with a first BWP and associated with measurements for communications at the UE over a frequency outside of the first BWP in a frequency domain, receive, from the base station, a downlink message including an indication of the first BWP, and communicate with the base station during a first time interval based on the indication of the first measurement gap configuration and the indication of the first BWP.

Some examples of the method, apparatuses, and non-transitory computer-readable medium described herein may further include operations, features, means, or instructions for receiving an indication of a second measurement gap configuration associated with a second BWP, receiving, from the base station, a second downlink message including an indication of the second BWP, and communicating with the base station during a second time interval based on the indication of the second measurement gap configuration and the indication of the second BWP.

Some examples of the method, apparatuses, and non-transitory computer-readable medium described herein may further include operations, features, means, or instructions for receiving an indication of a measurement object configuration associated with a set of multiple measurement occasions for performing measurements at the UE, receiving one or more messages during the set of multiple measurement occasions and associated with the frequency, and performing measurements for the one or more messages based on the first measurement gap configuration, where communicating with the base station during the first time interval may be based on performing the measurements.

Some examples of the method, apparatuses, and non-transitory computer-readable medium described herein may further include operations, features, means, or instructions for suspending communications with the base station within the first BWP based on the first measurement gap configuration and monitoring the one or more measurement occasions based on suspending the communications within the first BWP, where receiving the one or more messages may be based on the monitoring.

Some examples of the method, apparatuses, and non-transitory computer-readable medium described herein may further include operations, features, means, or instructions for determining an expiration of a timer associated with the first measurement gap configuration, an expiration of a validity period associated with the first measurement gap configuration, or both and communicating with the base station during a second time interval based on a modified first measurement gap configuration or a second measurement gap configuration based on the expiration of the timer, the expiration of the validity period, or both.

Some examples of the method, apparatuses, and non-transitory computer-readable medium described herein may further include operations, features, means, or instructions for receiving, via the control signaling, an indication of the timer, an indication of the validity period or both, where determining the expiration of the timer, the expiration of the validity period, or both may be based on the indication of the timer, the validity period, or both.

Some examples of the method, apparatuses, and non-transitory computer-readable medium described herein may further include operations, features, means, or instructions for transmitting, to the base station, an indication of a capability of the UE to perform communications based on the timer, where communicating with the base station during the first time interval based on the modified first measurement gap configuration or the second measurement gap configuration may be based on the indication of the capability.

Some examples of the method, apparatuses, and non-transitory computer-readable medium described herein may further include operations, features, means, or instructions for receiving, via the control signaling, an indication of a second measurement gap configuration associated with the first BWP and determining to perform communications based on the first measurement gap configuration or the second measurement gap configuration, where communicating with the base station during the first time interval may be performed based on the determined measurement gap configuration.

Some examples of the method, apparatuses, and non-transitory computer-readable medium described herein may further include operations, features, means, or instructions for receiving, via the downlink message, an indication of the first measurement gap configuration or the second measurement gap configuration, where determining to perform the communications based on the first measurement gap configuration or the second measurement gap configuration may be based on the indication of the first measurement gap configuration or the second measurement gap configuration.

Some examples of the method, apparatuses, and non-transitory computer-readable medium described herein may further include operations, features, means, or instructions for transmitting, to the base station, an indication of a capability of the UE to support a set of multiple measurement gap configurations associated with the first BWP, where receiving the control signaling, receiving the downlink message, communicating with the base station during the first time interval, or any combination thereof, may be based on the indication of the capability.

In some examples of the method, apparatuses, and non-transitory computer-readable medium described herein, the control signaling includes a RRC message and the method, apparatuses, and non-transitory computer-readable medium may include further operations, features, means, or instructions for receiving, via the RRC message, an indication of a set of multiple measurement gap configurations associated with a set of multiple BWPs for communications at the UE, where the set of multiple measurement gap configurations include the first measurement gap configuration, and where the set of multiple BWPs include the first BWP.

In some examples of the method, apparatuses, and non-transitory computer-readable medium described herein, each measurement gap configuration of the set of multiple measurement gap configurations corresponds to a respective BWP of the set of multiple BWPs.

Some examples of the method, apparatuses, and non-transitory computer-readable medium described herein may further include operations, features, means, or instructions for switching from the first BWP to a second BWP and communicating with the base station during a second time interval based on switching from the first BWP to the second BWP and based on a second measurement gap configuration of the set of multiple measurement gap configurations that corresponds to the second BWP.

In some examples of the method, apparatuses, and non-transitory computer-readable medium described herein, the downlink message includes a downlink control information (DCI) message, a medium access control-control element (MAC-CE) message, a RRC message, or any combination thereof.

Some examples of the method, apparatuses, and non-transitory computer-readable medium described herein may further include operations, features, means, or instructions for receiving, via the downlink message, an indication of an activity state associated with the first measurement gap configuration, the activity state including one of an active state or an inactive state, where communicating with the base station during the first time interval may be performed based on the activity state.

Some examples of the method, apparatuses, and non-transitory computer-readable medium described herein may further include operations, features, means, or instructions for receiving, via the downlink message, an indication of one or more parameters associated with the first measurement gap configuration, where communicating with the base station during the first time interval may be performed based on the one or more parameters.

In some examples of the method, apparatuses, and non-transitory computer-readable medium described herein, the control signaling and the downlink message may be received via a same downlink communication.

In some examples of the method, apparatuses, and non-transitory computer-readable medium described herein, the first measurement gap configuration includes a BWP index associated with the first BWP, a periodicity associated with a set of multiple measurement gaps, a gap duration associated with the set of multiple measurement gaps, a set of serving carriers associated with the first measurement gap configuration, a frequency range associated with the first measurement gap configuration, or any combination thereof.

Some examples of the method, apparatuses, and non-transitory computer-readable medium described herein may further include operations, features, means, or instructions for transmitting, to the base station, an indication of a capability of the UE to perform communications based on the first measurement gap configuration associated with the first BWP, where receiving the control signaling, receiving the downlink message, communicating with the base station during the first time interval, or any combination thereof, may be based on the indication of the capability.

Some examples of the method, apparatuses, and non-transitory computer-readable medium described herein may further include operations, features, means, or instructions for receiving, via the control signaling, an indication of a default activity state associated with the first measurement gap configuration, a second measurement gap configuration, or both, where communicating with the base station during the first time interval may be based on the indication of the default activity state.

A method for wireless communication at a base station is described. The method may include transmitting, to a UE, control signaling including an indication of a first measurement gap configuration associated with a first BWP and associated with measurements for communications at the UE over a frequency outside of the first BWP in a frequency domain, transmitting, to the UE, a downlink message including an indication of the first BWP, and communicating with the UE during a first time interval based on the indication of the first measurement gap configuration and the indication of the first BWP.

An apparatus for wireless communication at a base station is described. The apparatus may include a processor, memory coupled with the processor, and instructions stored in the memory. The instructions may be executable by the processor to cause the apparatus to transmit, to a UE, control signaling including an indication of a first measurement gap configuration associated with a first BWP and associated with measurements for communications at the UE over a frequency outside of the first BWP in a frequency domain, transmit, to the UE, a downlink message including an indication of the first BWP, and communicate with the UE during a first time interval based on the indication of the first measurement gap configuration and the indication of the first BWP.

Another apparatus for wireless communication at a base station is described. The apparatus may include means for transmitting, to a UE, control signaling including an indication of a first measurement gap configuration associated with a first BWP and associated with measurements for communications at the UE over a frequency outside of the first BWP in a frequency domain, means for transmitting, to the UE, a downlink message including an indication of the first BWP, and means for communicating with the UE during a first time interval based on the indication of the first measurement gap configuration and the indication of the first BWP.

A non-transitory computer-readable medium storing code for wireless communication at a base station is described. The code may include instructions executable by a processor to transmit, to a UE, control signaling including an indication of a first measurement gap configuration associated with a first BWP and associated with measurements for communications at the UE over a frequency outside of the first BWP in a frequency domain, transmit, to the UE, a downlink message including an indication of the first BWP, and communicate with the UE during a first time interval based on the indication of the first measurement gap configuration and the indication of the first BWP.

Some examples of the method, apparatuses, and non-transitory computer-readable medium described herein may further include operations, features, means, or instructions for transmitting, to the UE, an indication of a second measurement gap configuration associated with a second BWP, transmitting, to the UE, a second downlink message including an indication of the second BWP, and communicating with the UE during a second time interval based on the indication of the second measurement gap configuration and the indication of the second BWP.

Some examples of the method, apparatuses, and non-transitory computer-readable medium described herein may further include operations, features, means, or instructions for transmitting an indication of a measurement object configuration associated with a set of multiple measurement occasions for performing measurements at the UE, where communicating with the UE during the first time interval may be based on the indication of the measurement object configuration.

Some examples of the method, apparatuses, and non-transitory computer-readable medium described herein may further include operations, features, means, or instructions for determining an expiration of a timer associated with the first measurement gap configuration, an expiration of a validity period associated with the first measurement gap configuration, or both and communicating with the UE during a second time interval based on a modified first measurement gap configuration or a second measurement gap configuration based on the expiration of the timer, the expiration of the validity period, or both.

Some examples of the method, apparatuses, and non-transitory computer-readable medium described herein may further include operations, features, means, or instructions for transmitting, via the control signaling, an indication of the timer, an indication of the validity period or both, where determining the expiration of the timer, the expiration of the validity period, or both may be based on the indication of the timer, the validity period, or both.

Some examples of the method, apparatuses, and non-transitory computer-readable medium described herein may further include operations, features, means, or instructions for receiving, from the UE, an indication of a capability of the UE to perform communications based on the timer, where communicating with the UE during the first time interval based on the modified first measurement gap configuration or the second measurement gap configuration may be based on the indication of the capability.

Some examples of the method, apparatuses, and non-transitory computer-readable medium described herein may further include operations, features, means, or instructions for transmitting, via the control signaling, an indication of a second measurement gap configuration associated with the first BWP and determining to perform communications based on the first measurement gap configuration or the second measurement gap configuration, where communicating with the UE during the first time interval may be performed based on the determined measurement gap configuration.

Some examples of the method, apparatuses, and non-transitory computer-readable medium described herein may further include operations, features, means, or instructions for transmitting, via the downlink message, an indication of the first measurement gap configuration or the second measurement gap configuration, where determining to perform the communications based on the first measurement gap configuration or the second measurement gap configuration may be based on the indication of the first measurement gap configuration or the second measurement gap configuration.

Some examples of the method, apparatuses, and non-transitory computer-readable medium described herein may further include operations, features, means, or instructions for receiving, from the UE, an indication of a capability of the UE to support a set of multiple measurement gap configurations associated with the first BWP, where transmitting the control signaling, transmitting the downlink message, communicating with the UE during the first time interval, or any combination thereof, may be based on the indication of the capability.

In some examples of the method, apparatuses, and non-transitory computer-readable medium described herein, the control signaling includes a RRC message and the method, apparatuses, and non-transitory computer-readable medium may include further operations, features, means, or instructions for transmitting, via the RRC message, an indication of a set of multiple measurement gap configurations associated with a set of multiple BWPs for communications at the UE, where the set of multiple measurement gap configurations include the first measurement gap configuration, and where the set of multiple BWPs include the first BWP.

In some examples of the method, apparatuses, and non-transitory computer-readable medium described herein, the downlink message includes a DCI message, a MAC-CE message, a RRC message, or any combination thereof.

Some examples of the method, apparatuses, and non-transitory computer-readable medium described herein may further include operations, features, means, or instructions for transmitting, via the downlink message, an indication of an activity state associated with the first measurement gap configuration, the activity state including one of an active state or an inactive state, where communicating with the UE during the first time interval may be performed based on the activity state.

Some examples of the method, apparatuses, and non-transitory computer-readable medium described herein may further include operations, features, means, or instructions for transmitting, via the downlink message, an indication of one or more parameters associated with the first measurement gap configuration, where communicating with the UE during the first time interval may be performed based on the one or more parameters.

In some examples of the method, apparatuses, and non-transitory computer-readable medium described herein, the control signaling and the downlink message may be received via a same downlink communication.

In some examples of the method, apparatuses, and non-transitory computer-readable medium described herein, the first measurement gap configuration includes a BWP index associated with the first BWP, a periodicity associated with a set of multiple measurement gaps, a gap duration associated with the set of multiple measurement gaps, a set of serving carriers associated with the first measurement gap configuration, a frequency range associated with the first measurement gap configuration, or any combination thereof.

Some examples of the method, apparatuses, and non-transitory computer-readable medium described herein may further include operations, features, means, or instructions for receiving, from the UE, an indication of a capability of the UE to perform communications based on the first measurement gap configuration associated with the first BWP, where transmitting the control signaling, transmitting the downlink message, communicating with the UE during the first time interval, or any combination thereof, may be based on the indication of the capability.

Some examples of the method, apparatuses, and non-transitory computer-readable medium described herein may further include operations, features, means, or instructions for transmitting, via the control signaling, an indication of a default activity state associated with the first measurement gap configuration, a second measurement gap configuration, or both, where communicating with the UE during the first time interval may be based on the indication of the default activity state.

DETAILED DESCRIPTION

Figure 1:
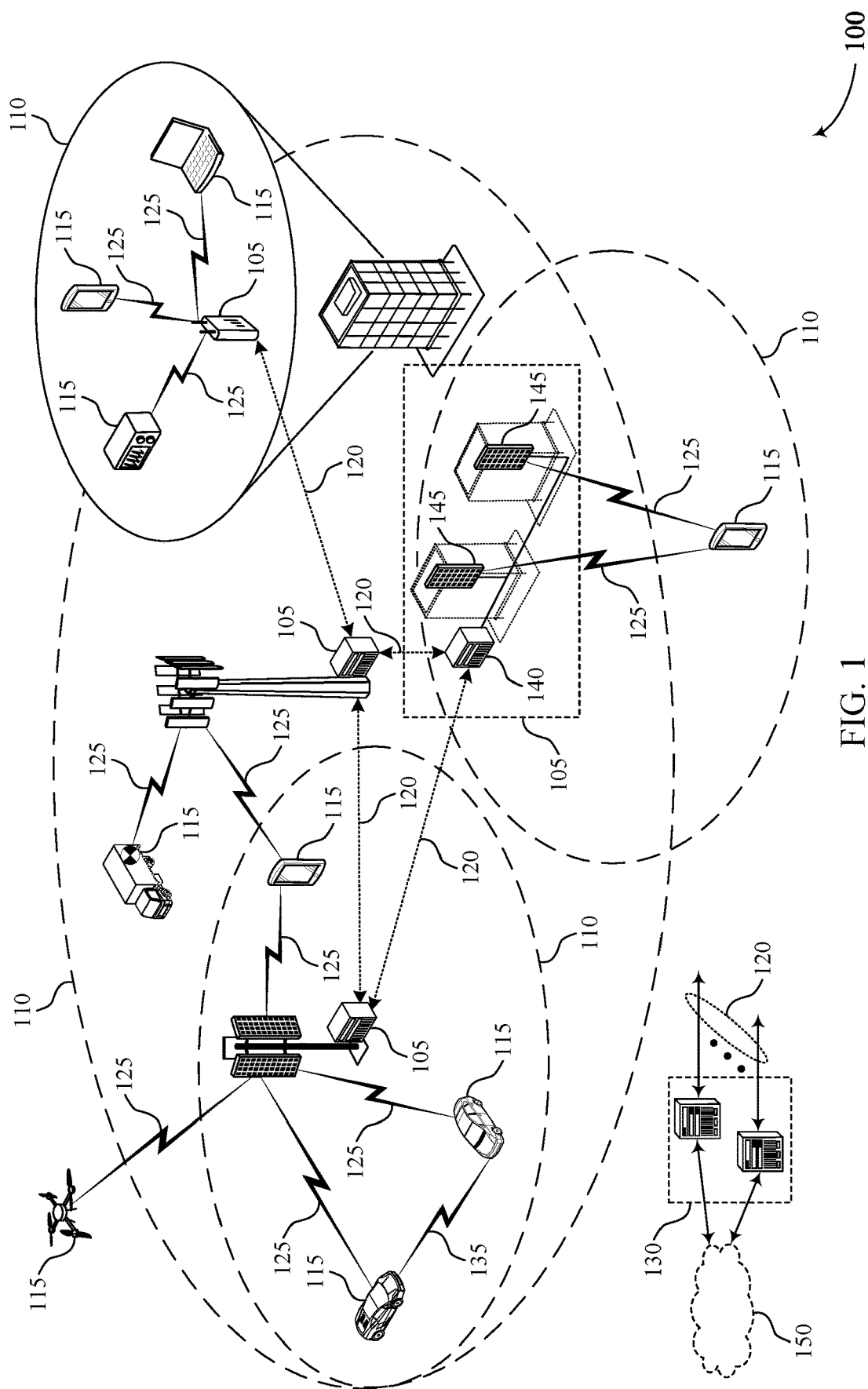
FIG. 1 illustrates an example of a wireless communications system that supports techniques for measurement gap configurations in accordance with aspects of the present disclosure.

In some wireless communications systems, a user equipment (UE) may be configured with multiple bandwidth parts (BWPs), where a single BWP of the multiple BWPs may be active at any one time. In some cases, a UE may be configured to measure signals outside of the active BWP configured at the UE in the frequency domain. For example, the UE may be configured to measure downlink messages received from, for example, a different serving cell (e.g., target base station) where the downlink messages may be outside of the active BWP at the UE to facilitate handover decisions. In such cases, the UE may be configured with a measurement gap configuration, which may include one or more defined gaps during which the UE may suspend communications over the active BWP, re-tune radio frequency (RF) components to a different frequency, or perform measurements on messages received at the respective frequency, or any combination thereof, among other operations.

However, other different wireless communications systems may enable a UE to be configured with a single measurement gap configuration. The inability to switch measurement gap configurations or modify the configured measurement gap configuration (or both) may result in a decrease of throughput at both the UE and the base station. Additionally, the measurement gap configuration may have to be re-configured each time the UE switches between BWPs, which may result in increased measurement delay, and missed opportunities for performing handover procedures.

Accordingly, aspects of the present disclosure provide techniques for configuring a UE with multiple measurement gap configurations. In particular, aspects of the present disclosure provide techniques for configuring a UE with a set of measurement gap configurations on a per-BWP basis. For example, the UE may be configured with a set of measurement gap configurations, where each measurement gap configuration may be associated with a respective BWP configured at the UE. In some cases, the UE may be pre-configured with the set of measurement gap configurations and signaling from the base station may indicate which pre-configured measurement gap configuration to use. Additionally, or alternatively, the set of measurement gap configurations (and mappings to associated BWPs) may themselves be signaled via signaling, such as radio resource control (RRC) signaling. The UE may then receive an indication to perform communications within a given BWP, and the UE may perform communications within the indicated BWP and in accordance with a measurement gap configuration associated with the respective BWP.

In some aspects, each measurement gap configuration may define a periodicity of measurement gaps, a time duration of measurement gaps, an activity state (e.g., active, inactive), applicable target cells, or applicable frequency ranges, or other information, or any combination thereof. In some aspects, downlink messages (e.g., downlink control information (DCI) messages, media access control (MAC) control element (MAC-CE) messages) which indicate BWP switches from a source BWP to a target BWP may indicate parameters or changes to measurement gap configurations associated with the measurement gap configuration corresponding to the target BWP (or both), among other information. In some cases, the UE may apply a measurement gap configuration for a defined validity time, based on a timer for the respective measurement gap configuration, or both. In some other cases, the UE may apply a measurement gap configuration based on pre-configured activity state (e.g., default ON activity state, default OFF activity state) for the respective measurement gap configuration. Moreover, the UE may transmit capability signaling indicating various capabilities of the UE, including a quantity of measurement gap configurations which may be associated with each BWP, a capability to apply measurement gap configurations according to a timer, and the like.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for measurement gap configurations.

FIG. 1 illustrates an example of a wireless communications system 100 that supports techniques for measurement gap configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-pus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques for configuring UEs 115 with multiple measurement gap configurations. In particular, aspects of the present disclosure provide techniques for configuring a UE 115 with a set of measurement gap configurations on a per-BWP basis. For example, the UE 115 may be configured with a set of measurement gap configurations, where each measurement gap configuration is associated with a BWP configured at the UE 115. In some cases, the UE 115 may be pre-configured with the set of measurement gap configurations and signaling from the base station 105 may indicate which pre-configured measurement gap configuration to use. Additionally, or alternatively, the set of measurement gap configurations (and mappings to associated BWPs) may themselves be signaled via RRC signaling. The UE 115 may then receive an indication to perform communications within a given BWP, and the UE 115 may perform communications within the indicated BWP and in accordance with a measurement gap configuration associated with the respective BWP.

In some aspects, each measurement gap configuration may define a periodicity of measurement gaps, a time duration of measurement gaps, an activity state (e.g., active, inactive), applicable target cells, and/or applicable frequency ranges. In some aspects, downlink messages (e.g., DCI messages, MAC-CE messages) which indicate BWP switches from a source BWP to a target BWP may indicate parameters and/or changes to measurement gap configurations associated with the measurement gap configuration corresponding to the target BWP. In some cases, the UE 115 may apply a measurement gap configuration for a defined validity time, based on a timer for the respective measurement gap configuration, or both. Moreover, the UE 115 may transmit capability signaling indicating various capabilities of the UE 115, including a quantity of measurement gap configurations which may be associated with each BWP, a capability to apply measurement gap configurations according to a timer, and the like.

Techniques described herein may improve measurement for signals received outside of an active BWP at a UE 115. In particular, by configuring a UE 115 with multiple measurement gap configurations (e.g., on a per-BWP basis), techniques described herein may enable measurement gap configurations to be configured in accordance with one or more measurement object configurations. Configuring a UE 115 with multiple measurement gap configurations may additionally improve throughput at the UE 115 and the base station 105 in cases where measurements need not be performed outside of the active BWP at the UE 115. Moreover, configuring measurement gap configurations on a per-BWP basis may prevent the need for a measurement gap configuration to be re-configured each time the switches between BWPs, which may reduce a latency of measurements performed at the UE 115 and facilitate improved handover decisions at the UE 115.

Figure 2:
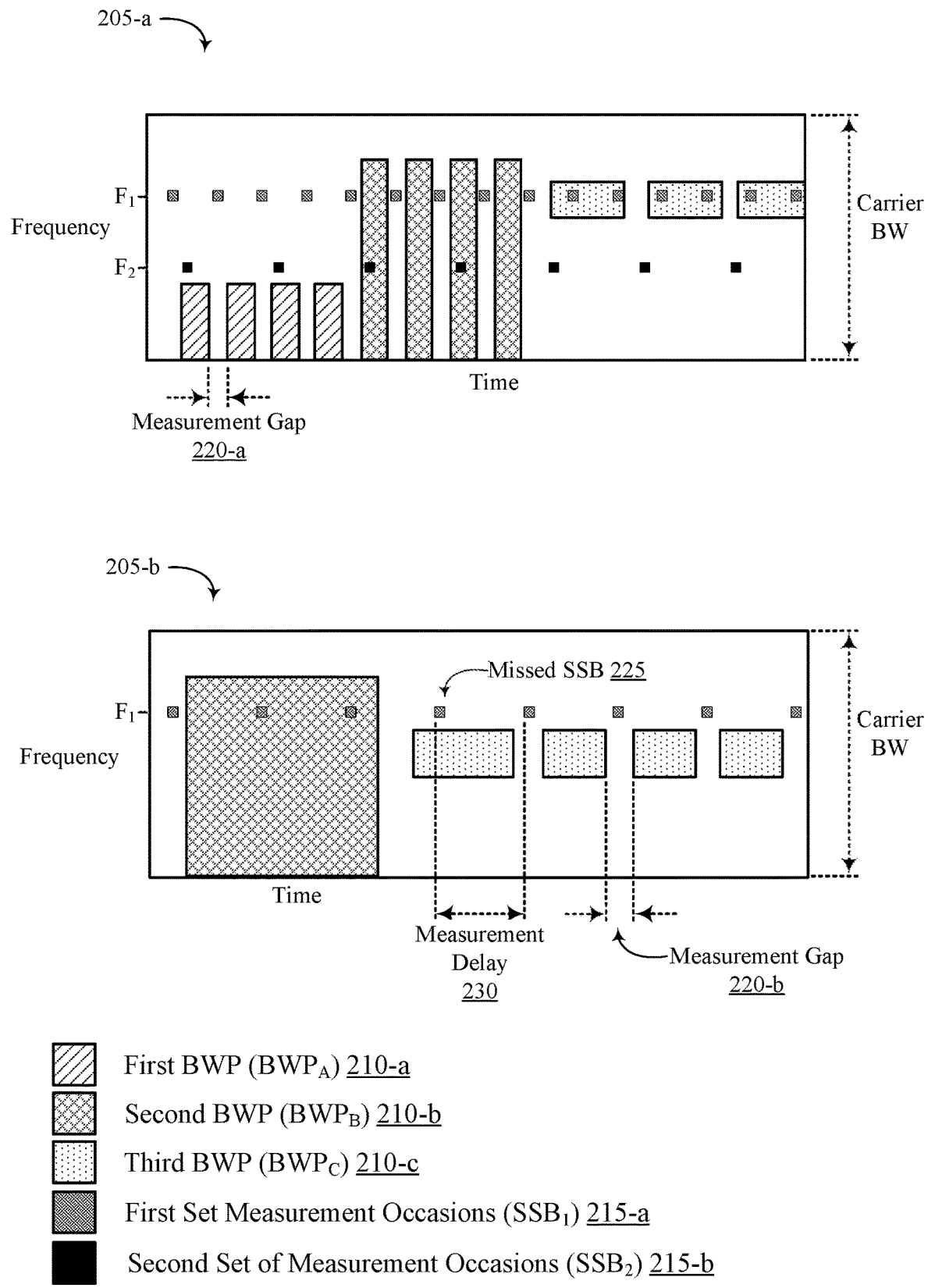
FIG. 2 illustrates an example of a resource configuration that supports techniques for measurement gap configurations in accordance with aspects of the present disclosure.

FIG. 2 illustrates an example of a resource configuration 200 that supports techniques for measurement gap configurations in accordance with aspects of the present disclosure. Aspects of the resource configuration 200 may implement, or be implemented, by wireless communications system 100.

In some aspects, a UE 115 may be configured with multiple BWPs 210, for example up to four BWPs 210, for performing communications at the UE 115. A BWP 210 may refer to a set of contiguous PRBs within a carrier bandwidth of the UE 115 in which a UE 115 is configured to communicate. For example, a UE 115 may be configured to communicate within a carrier bandwidth of 100 MHz (e.g., 275 PRBs), where the carrier bandwidth includes (e.g., is associated with) one or more BWPs 210 with a bandwidth of 20 MHz. In some aspects, out of a set of BWPs 210 configured at a UE 115, only one of the BWPs 210 may be active at any one time.

The UE 115 may be configured to perform "BWP switching" in order to switch between one BWP 210 to another. That is, the UE 115 may be configured to communicate in accordance with a first BWP 210 (e.g., first BWP 210 is active), and may perform a BWP switching procedure in order to communicate in accordance with a second BWP 210 (e.g., second BWP is active). BWP switching procedures may include retuning of radio frequency components, internal processing, beam switching procedures, and the like. In some aspects, the UE 115 may be configured to switch between BWPs 210 based on traffic needs of the network. That is, the network (e.g., a base station 105) may transmit control signaling (e.g., RRC signaling, DCI signaling, MAC-CE messages) which schedule communications at the UE 115 in a different BWP 210 compared to an active BWP 210 at the UE 115, and may therefore implicitly indicate for the UE 115 to perform a BWP switching procedure. Additionally, or alternatively, downlink signaling may explicitly indicate for the UE 115 to perform BWP switching.

In some cases, the UE 115 may be configured to switch from a first BWP 210 to another based on a validity time associated with the first BWP 210, a timer associated with the first BWP 210, or both. Timers and/or validity periods associated with BWPs 210 configured at the UE 115 may be pre-configured at the UE 115, signaled to the UE 115 via the network, or both.

In some wireless communications systems (e.g., wireless communications system 100), the UE 115 may be configured with a measurement object configuration (measObjectNR). The term "measurement object configuration" may be used to refer to a data structure which includes or indicates a configuration for measuring signals (e.g., synchronization signal blocks (SSBs)) received from target cells. In other words, a measurement object configuration may define a set of resources (e.g., time resources, frequency resources, location) for performing measurements on signals (e.g., SSBs) received from a target cell/target base station 105. As such, a measurement object configuration may be associated with, or define, a set of measurement occasions for performing measurements on signaling (e.g., SSBs) received from target base stations 105 (e.g., defined measurement occasions for performing handover decisions).

For example, referring to a resource allocation scheme 205-a illustrated in FIG. 2, a first measurement object configuration may be associated with a first set of measurement occasions 215-a, and a second measurement object configuration may be associated with a second set of measurement occasions 215-b. In this example, the UE 115 may be configured to receive a first set of SSBs (e.g., $SSB_1$) from a target cell within the first set of measurement occasions 215-a, and may be configured to receive a second set of SSBs (e.g., $SSB_2$) from a same or different target cell within the second set of measurement occasions 215-b.

In cases where the set of resources associated with a measurement gap configuration is within the active BWP 210 of the UE 115 (e.g., within a same carrier frequency), the UE 115 may be able to perform measurements for a target cell in accordance with the measurement object configuration without switching away from the active BWP 210. For example, if measurement occasions indicated by a measurement gap configuration are positioned within a carrier frequency which is within the active BWP 210 of a UE 115 (e.g., within BWP 210 of the serving cell), the UE 115 may be able to perform measurements on SSBs received within the measurement occasions and within the active BWP 210. For example, as shown in resource allocation scheme 205-b, the first set of measurement occasions 215-a may be positioned within the second BWP 210-b in the frequency domain. As such, in cases where the second BWP 210-b is active, the UE 115 may be able to perform measurements within the first set of measurement occasions 215-a while performing communications within the second BWP 210-b.

Conversely, in cases where the set of resources associated with a measurement gap configuration are outside of the active BWP 210 of the UE 115 (e.g., within a different carrier frequency), the UE 115 may be unable to perform measurements within the defined measurement occasions 215 while communicating within the active BWP 210. That is, if the measurement occasions 215 of the measurement object configuration are outside of the active BWP 210, the UE 115 may be required to switch away from the active BWP 210 in order to perform measurements on SSBs received with the measurement occasions. For example, as shown in resource allocation scheme 205-a, the first and second sets of measurement occasions 215-a, 215-b may be positioned outside of the first BWP 210-a in the frequency domain. As such, in cases where the first BWP 210-a is active, the UE 115 may be unable to perform measurements within the sets of measurement occasions 215-a, 215-b while performing communications within the first BWP 210-a.

In such cases where the UE 115 is configured with a measurement object configuration which is associated with measurement occasions 215 which are outside of the active BWP 210 of the UE 115 in the frequency domain, the UE 115 may be configured with measurement gap configurations (MeasGapConfig) which enable the UE 115 to perform communications and/or measurements outside of the active BWP 210 at the UE 115. The term "measurement gap configuration" may be used herein to refer to a configuration which includes agreed (e.g., defined, pre-configured) suspensions of data transfer between a UE 115 and its serving cells. In other words, a measurement gap configuration may include measurement gaps 220 during which the UE 115 suspends data transfer over the active BWP 210 in order to perform various types of measurements, including measurements on signals (e.g., $SSB_1$, $SSB_2$) received from target cells for the purposes of facilitating handover decisions.

In some aspects, measurement gaps 220 of a measurement gap configuration may at least partially overlap with measurement occasions 215 of a measurement object configuration in the time domain. That is, the measurement gaps 220 may coincide with the measurement occasions 215 so that the UE 115 may "tune away" (e.g., adjust RF components, perform a BWP switching procedure) from the active BWP 210 during the measurement gaps 220 in order to preform measurements on signals (e.g., SSBs) received within the measurement occasions 215. For example, as shown in the resource allocation scheme 205-a, the set of measurement gaps 220-a may overlap with the first set of measurement occasions 215-a for at least a period of time during which the UE 115 communicates using the first BWP 210-a. As such, in cases where the first BWP 210-a is active, the UE 115 may be able to "tune away" from the first BWP 210-a to perform measurements on SSBs (e.g., $SSB_1$) received within the first set of measurement occasions 215-a.

In some aspects, measurement gap configurations may be defined by a quantity of parameters. Parameters which define a measurement gap configuration may include a length of measurement gaps 220 (e.g., measurement gap length (MGL)), a repetition period (e.g., measurement gap repetition period (MGRP)), a measurement gap 220 offset, a measurement gap time advance (MGTA), a reference cell indicator (e.g., target cell which is to be measured during measurement gaps), or any combination thereof. In some implementations, a UE 115 may be configured (e.g., pre-configured) with a measurement gap configuration. Additionally, or alternatively, the network may configure a UE 115 with a measurement gap configuration via control signaling (e.g., RRC signaling, GapConfig signaling).

In some wireless communications systems, a UE 115 may only be able to be configured with a single measurement gap configuration. In some cases, the use of a single measurement gap configuration may result in a reduction of throughput at the UE 115 and/or the base station 105. For example, as shown in resource allocation scheme 205-a, the measurement gap configuration may define a first set of measurement gaps 220-a which enable the UE 115 to perform measurements within the first set of measurement occasions 215-a while communicating according to the first BWP 210-a. However, upon switching to the second BWP 210-b and/or third BWP 210-c, the measurement gap configuration may be unnecessary, as the second and third BWPs 210-*b*, 210-*c* overlap with (e.g., cover) the first set of measurement occasions 215-*a* in the time domain. That is, the second and third BWPs 210-*b*, 210-*c* may enable the UE 115 to perform measurements on the SSBs (e.g., $SSB_1$) received within the first set of measurement occasions 215-*a*. In this example, without reconfiguration of the measurement gap configuration, the periodical interruptions of traffic caused by the measurement gaps 220-*a* may reduce throughput at the UE 115 and/or the base station 105. For instance, in cases where the measurement gap configuration exhibits an MGRP of 40 ms and an MGL of 6 ms, the measurement gap configuration may result in a 15% reduction in throughput at the UE 115.

Even in cases where the single measurement gap configuration is reconfigured at the UE 115, the time required to reconfigure the single measurement gap configuration may result in a measurement delay 230 which causes the UE 115 to miss opportunities for measuring signals received within measurement occasions 215, which may delay handover decisions at the UE 115.

For example, referring to a resource allocation scheme 205-*b* illustrated in FIG. 2, the UE 115 may communicate within a second BWP 210-*b*, and may subsequently switch (e.g., perform a BWP switching procedure) to a third BWP 210-*c*. As shown in resource allocation scheme 205-*b*, upon switching to the third BWP 210-*c*, the initial configuration of the measurement gap configuration may not align with the set of measurement occasions 215-*a*. That is, the measurement gaps 220-*b* of the measurement gap configuration may not initially align with the measurement occasions 215-*a* upon switching to the third BWP 210-*c*. As such, the measurement gap configuration may have to be reconfigured (e.g., via RRC) so that the measurement gaps 220-*b* align with the measurement occasions 215-*a*.

However, the UE 115 may be able to perform BWP switches faster and more dynamically as compared to RRC signaling used to reconfigure the measurement gap configuration. As such, the reconfiguration of the measurement gap configuration may take some time, which may cause the UE 115 to miss a measurement occasion (e.g., missed SSB 225), thereby resulting in a measurement delay 230. The reconfiguration of the measurement gap configuration may result in the UE 115 being unable to measure the first measurement occasion 215 following the BWP switch, thereby resulting in the missed SSB 225, which may delay handover decisions at the UE 115 for at least a duration of the measurement delay 230.

Accordingly, aspects of the present disclosure provide techniques for configuring a UE 115 with multiple measurement gap configurations. In particular, aspects of the present disclosure provide techniques for configuring a UE with a set of measurement gap configurations on a per-BWP basis. For example, referring to the first resource allocation scheme 205-*a*, the UE 115 may be configured with a first measurement gap configuration associated with the first BWP 210-*a*, a second measurement gap configuration associated with the second BWP 210-*b*, and a third measurement gap configuration associated with the third BWP 210-*c*. In this example, the second measurement gap configuration associated with the second BWP 210-*b* may exhibit fewer, shorter, or an absence of measurement gaps 220 due to the fact that the sets of measurement occasions 215-*a*, 215-*b* are within the second BWP 210-*b*. As such, configuring the UE 115 with multiple measurement gap configurations on a per-BWP basis may improve a throughput at the UE 115 and the base station 105 when the second BWP 210-*a* in the first resource allocation scheme is active.

By way of another example, referring to the first resource allocation scheme 205-*a*, the UE 115 may be configured with a second measurement gap configuration associated with the second BWP 210-*b*, and a third measurement gap configuration associated with the third BWP 210-*c*. In this example, upon switching from the second BWP 210-*b* to the third BWP 210-*c* the UE 115 may be configured to automatically (e.g., without reconfiguration of a measurement gap configuration) perform communications associated with the third measurement gap configuration corresponding to the third BWP 210-*c*. As such, configuring the UE 115 with multiple measurement gap configurations on a per-BWP basis may negate the need to reconfigure a measurement gap configuration upon switching from the second BWP 210-*b* to the third BWP 210-*c*, which may prevent the missed SSB 225, reduce (or eliminate) the measurement delay 230, and reduce a latency of handover decisions at the UE 115.

Figure 3:
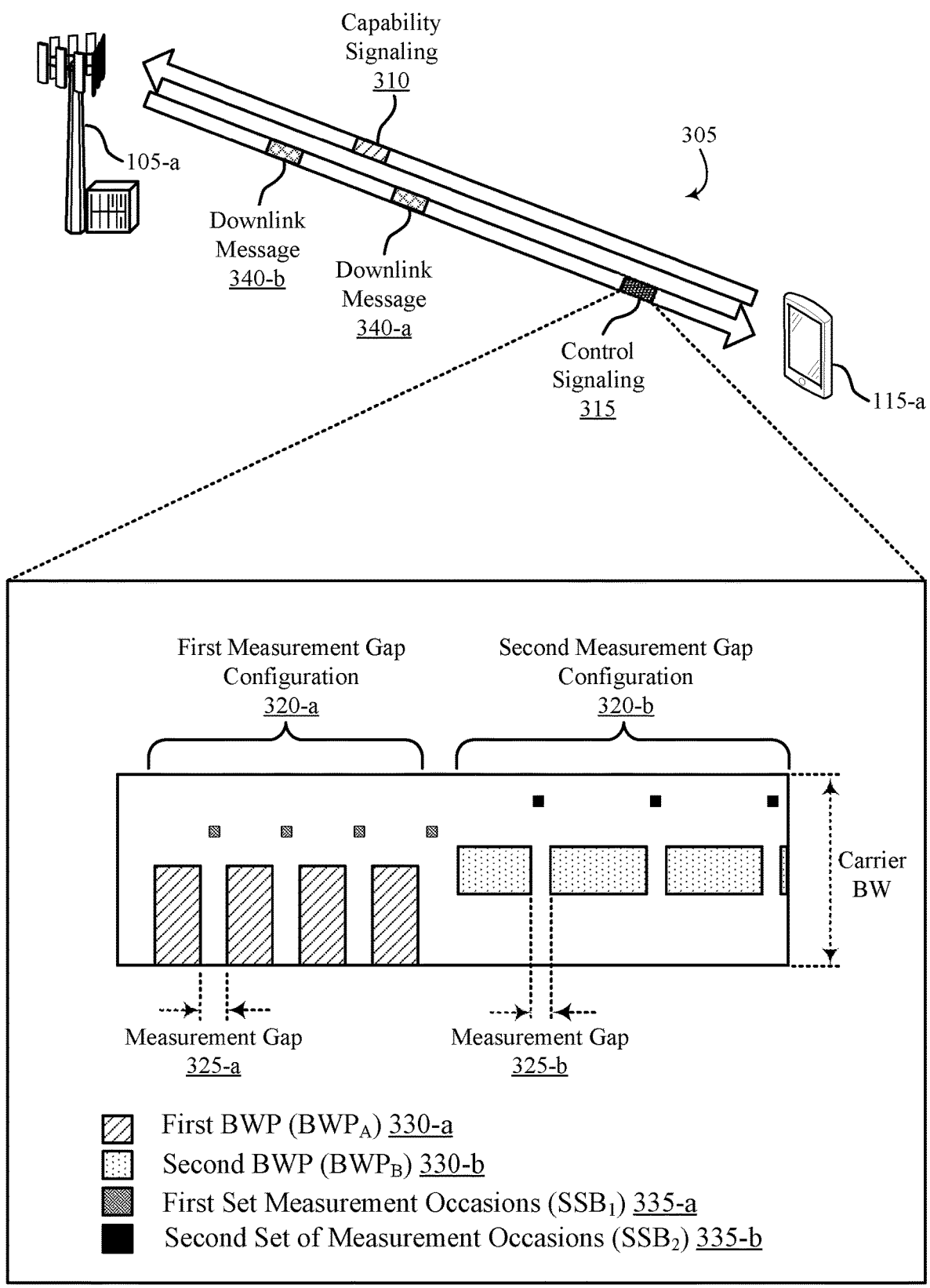
FIG. 3 illustrates an example of a wireless communications system that supports techniques for measurement gap configurations in accordance with aspects of the present disclosure.

FIG. 3 illustrates an example of a wireless communications system 300 that supports techniques for measurement gap configurations in accordance with aspects of the present disclosure. In some examples, wireless communications system 300 may implement, or be implemented by, aspects of wireless communications system 100, resource configuration 200, or both. For example, wireless communications system 300 may support signaling for configuring the UE 115-*a* with multiple measurement gap configurations, as described in FIGS. 1-2.

The wireless communications system 300 may include a base station 105-*a* and a UE 115-*a*, which may be examples base stations 105 and UEs 115 as described with reference to FIG. 1. The UE 115-*a* may communicate with the base station 105-*a* using a communication link 305, which may be an example of an NR or LTE link between the UE 115-*a* and the base station 105-*a*. In some cases, the communication link 305 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals, to the base station 105-*a* using the communication link 305 and the base station 105-*a* may transmit downlink signals, such as downlink control signals or downlink data signals, to the UE 115-*a* using the communication link 305.

In some aspects, the UE 115-*a* and the base station 105-*a* of the wireless communications system 300 may support techniques for configuring the UE 115-*a* with multiple measurement gap configurations. In particular, the UE 115-*a* and the base station 105-*a* of the wireless communications system 300 mays support techniques for configuring the UE 115-*a* with a set of measurement gap configurations on a per-BWP basis. As noted previously herein, the UE 115-*b* may be configured with multiple BWPs 330, for example up to four BWPs 330 (e.g., four candidate BWPs 330), where only one BWP 330 is active at a time.

In some aspects, the UE 115-*a* may transmit, to the base station 105-*a* (e.g., PCell), capability signaling 310 (e.g., UE capability message(s)) indicating one or more capabilities associated with configuring the UE 115-*a* with measurement gap configurations 320. For example, the capability signaling 310 may indicate whether the UE 115-*a* is capable of being configured with multiple measurement gap configurations 320 on a per-BWP basis, a per-frequency range basis, a per-band basis, or any combination thereof. By way of another example, the capability signaling 310 may indicate whether the UE 115-*a* supports a timer-based expiration mechanism for measurement gap configurations 320 configured at the UE 115-a. Moreover, the capability signaling 310 may indicate other implementation-specific limitations associated with configuring measurement gap configurations 320 at the UE 115-a, such as a quantity of measurement gap configurations 320 which may be associated with each respective BWP.

In some aspects, the UE 115-a may receive, from the first base station 105-a, control signaling 315 which indicates one or more measurement gap configurations 320 associated with one or more BWPs 330 configured for communications at the UE 115-a. The control signaling 315 may include an RRC message, a DCI message, or both. For example, as shown in FIG. 3, the control signaling 315 may indicate a first measurement gap configuration 320-a associated with a first BWP 330-a, and a second measurement gap configuration 320-b associated with a second BWP 330-b.

The one or more measurement gap configurations 320 may be associated with measurements for communications at the UE 115-a over a frequency which is outside of the corresponding BWP 330 in the frequency domain. For example, the first measurement gap configuration 320-a may be associated with a first measurement gap configuration index ($MG_{index}$), a BWP index ($BWP_{index}$) associated with the first BWP 330-a, a gap duration associated with a set of measurement gaps 325-a of the first measurement gap configuration 320-a (gapConfig), a set of serving carriers associated with the first BWP 330-a, a frequency range, an activity state (e.g., active state (ON), inactive state (OFF), default activity state), or any combination thereof. The activity state may be indicated via a binary (or non-binary) indicator indicating whether each respective measurement gap configuration 320 is enabled (e.g., active state) or disabled (e.g., inactive state) per individual BWP.

In some implementations, the UE 115-a may receive the control signaling 315 based on transmitting the capability signaling 310. For example, in cases where the UE 115-a indicates a capability to be configured with multiple measurement gap configurations 320 on a per-BWP basis, the control signaling 315 may configure the UE 115-a with a set of measurement gap configurations 320 on a per-BWP basis. By way of another example, in cases where the UE 115-a indicates a capability to support multiple measurement gap configurations 320 associated with a single BWP 330, the control signaling 315 may configure the UE 115-a with a set of measurement gap configurations 320 which are each associated with a single BWP 330 at the UE 115-a.

In some aspects, the control signaling 315 may configure the UE 115-a with a set of measurement gap configurations 320 which are associated with a set of BWPs at the UE 115-a. For example, in cases where the UE 115-a may be configured with a set of multiple BWPs 330, for example four BWPs 330, the control signaling 315 may configure the UE 115-a with a set of four measurement gap configurations 320 which correspond to the four respective BWPs (e.g., one-to-one mapping between measurement gap configurations 320 and BWPs). In additional or alternative cases, a single measurement gap configuration 320 may be associated with multiple BWPs 330. Similarly, in some cases, a single BWP 330 may be associated with multiple measurement gap configurations 320 which may be activated/deactivated independently and/or concurrently.

The control signaling 315 may indicate one or more parameters associated with the measurement gap configurations 320, including timers associated with the respective measurement gap configurations 320, validity periods associated with the measurement gap configurations 320, or both. For example, the control signaling 315 may indicate a timer and/or a validity period associated with the first measurement gap configuration 320-a. In this example, the timer may indicate a time duration during which the UE 115-a may be configured to perform communications according to the first measurement gap configuration 320-a, where the UE 115-a retires the first measurement gap configuration 320-a (e.g., transitions the first measurement gap configuration 320-a to an inactive state) following an expiration of the timer.

In some aspects, the UE 115-a may identify one or more measurement gap configurations 320-a configured at the UE 115-a based on the indication of the measurement gap configurations 320 received via the control signaling 315 (e.g., RRC signaling). Additionally, or alternatively, the UE 115-a may be configured (e.g., pre-configured) with the one or more measurement gap configurations 320, and may therefore be configured to identify the measurement gap configurations 320 without the explicit control signaling 315.

In some aspects, the UE 115-a may receive, from the base station 105-a, an indication of one or more measurement object configurations, where each measurement object occasion is associated with a set of measurement occasions 335 for performing measurements at the UE 115-a. Each measurement object configuration may include a data structure which includes or indicates a configuration for measuring signals (e.g., SSBs) received from target cells, as shown and described in FIG. 2. For example, the UE 115-b may receive an indication of a first measurement object configuration associated with a first set of measurement occasions 335-a, and a second measurement object configuration associated with a second set of measurement occasions 335-b.

The indication of the measurement object configuration(s) may be received via an RRC message, a DCI message, a MAC-CE message, or any combination thereof. In some implementations, the control signaling 315 may include the indication of the measurement object configuration. In additional or alternative implementations, the UE 115-a may be pre-configured with one or more measurement object configurations.

In some implementations, the UE 115-a may receive, from the base station 105-a, a downlink message 340-a (e.g., DCI message, MAC-CE message) which includes an indication of the first BWP 330-a for communications at the UE 115-a. In this regard, the downlink message 340-a may include an indication for the UE 1115-a to communicate in accordance with the first BWP 330-a. The downlink message 340-a may explicitly indicate for the UE 115-a to switch to the first BWP 330-a, may schedule a communication with the UE 115-a within the first BWP 330-a, or both.

The UE 115-a may receive the downlink message 340-a based on transmitting the capability signaling 310, receiving the control signaling 315, identifying the measurement gap configurations 320, receiving the measurement object configuration(s), or any combination thereof. In some implementations, the control signaling 315, the indication of the measurement object configuration at 420, the downlink message 340-a, or any combination thereof, may be received in the same communication. For example, in some cases, the UE 115-a may receive the control signaling 315 and the downlink message 340-a via a same downlink communication (e.g., single RRC message, single DCI message).

The downlink message 340-a may include one or more parameters associated with the first BWP 330-a and/or the first measurement gap configuration 320-a associated with the first BWP 330-a, including an activity state associated with first measurement gap configuration 320-*a*, a timer and/or validity period for the first measurement gap configuration 320-*a*, and the like. For example, the downlink message 340-*a* (e.g., DCI message) may include an indication of an activity state associated with the first measurement gap configuration 320-*a* associated with the first BWP 330-*a*. For instance, the downlink message 340-*a* may indicate an active state, and may thereby indicate for the UE 115-*a* to transition the first measurement gap configuration 320-*a* from an inactive state to the active state. In cases where the downlink message 340-*a* does not indicate an activity state for the first measurement gap configuration 320-*a*, the UE 115-*a* may be configured to follow a default activity state (which may be configured via the control signaling 315) for the first measurement gap configuration 320-*a* to enable/disable the first measurement gap configuration 320-*a*.

In cases where the first BWP 330-*a* is associated with multiple measurement gap configurations 320, the downlink message 340-*a* may indicate which measurement gap configuration 320 is to be used. For example, the first BWP 330-*a* may be configured with (e.g., associated with) a first measurement gap configuration 320-*a* and a third measurement gap configuration 320. In this example, the downlink message 340-*a* may include an indication of the first measurement gap configuration 320-*a*, the third measurement gap configuration 320, or both, thereby instructing the UE 115-*a* as to which measurement gap configuration 320 should be used for the first BWP 330-*a*.

In some implementations, the downlink message 340-*a* (e.g., DCI message, RRC message, MAC-CE message) may modify and/or reconfigure one or more parameters of the first measurement gap configuration 320-*a*. In particular, the network (e.g., first base station 105-*a*) may keep track of measurement gap configurations 320, candidate BWPs 330, and/or measurement object configurations associated with the UE 115-*a*, and may be configured to modify/reconfigure the measurement gap configurations 320 via control signaling 315 (e.g., during RRC connection, during inactive states). For example, the downlink message 340-*a* may indicate one or more parameters associated with the first measurement gap configuration 320-*a*, where the one or more parameters may define and/or selectively modify the first measurement gap configuration 320-*a*, including a length of measurement gaps 325-*a*, a periodicity of measurement gaps 325-*a*, an offset of measurement gaps 325-*a*, a timer, a validity time, and the like.

Subsequently, the UE 115-*a* may communicate with the base station 105-*a* during a first time interval (e.g., first slot, first set of slots) based on (e.g., within) the first BWP 330-*a* and based on the first measurement gap configuration 320-*a*. For example, the UE 115-*a* may transmit uplink communications to the base station 105-*a* within the first BWP 330-*a* and/or receive downlink communications from the base station 105-*a* within the first BWP 330-*a*.

In cases where the first BWP 330-*a* is associated with multiple measurement gap configurations 320, the UE 115 may be configured to determine which measurement gap configuration 320 to apply. For example, the first BWP 330-*a* may be associated with the first measurement gap configuration 320-*a* and a third measurement gap configuration 320, where the base station 105-*a* indicates whether the UE 115-*a* is to apply the first measurement gap configuration 320-*a* or the third measurement gap configuration 320.

In some aspects, the UE 115-*a* may suspend communications with the base station 105-*a* within the first BWP 330-*a*. In particular, the UE 115-*a* may suspend communications (e.g., suspend uplink/downlink communications) within the first BWP 330-*a* in accordance with the first measurement gap configuration 320. For example, the UE 115-*a* may suspend communications during/within the set of measurement gaps 325-*a* of the first measurement gap configuration 320-*a*. The UE 115-*a* may suspend communications by turning off or retuning radio frequency components, performing beam switching procedures, performing BWP switching procedures, or any combination thereof.

The UE 115-*a* may be configured to suspend communications within the first BWP 330-*a* in order to perform measurements on signals received outside of the first BWP 330-*a* (e.g., outside of the active BWP 330). In this regard, the UE 115-*a* may suspend data transfer within the first BWP 330-*a* to perform measurements in accordance with a measurement object configuration associated with the first set of measurement occasions 335-*a*. As such, the UE 115-*a* may monitor the first set of measurement occasions 335-*a* associated with the configured measurement object configurations. In this regard, the UE 115-*a* may monitor the first set of measurement occasions 335-*a* which are associated with a frequency which is outside of the first BWP 330-*a* in the frequency domains. As such, the UE 115-*a* may monitor the first set of measurement occasions 335-*a* based on the respective measurement object configuration, suspending communications within the first BWP 330-*a*, or both.

Subsequently, the UE 115-*a* may receive one or more messages within the first set of measurement occasions 335-*a*. For example, the UE 115-*a* may receive one or more messages (e.g., SSBs) from a second base station 105 within a measurement occasion 335 of the first set of measurement occasions 335-*a*. In this example, the second base station 105 may transmit the SSBs, and the UE 115-*a* may measure the SSBs within the first set of measurement occasions 335-*a* in order to facilitate handover decisions. As shown in FIG. 3, the UE 115-*a* may be configured to receive messages within the first set of measurement occasions 335-*a* based on the set of measurement gaps 325-*a* at least partially overlapping with the first set of measurement occasions 335-*a* in the time domain.

The UE 115-*a* may be configured to perform measurements for the messages (e.g., SSBs) received within the first set of measurement occasions 335-*a*. The UE 115-*a* may perform the measurements based on the first measurement gap configuration 320-*a* associated with the first BWP 330-*a*, the measurement object configurations, or both. Moreover, the UE 115-*a* may perform the measurements based on suspending communications within the first BWP 330-*a*, monitoring the first set of measurement occasions 335-*a*, or any combination thereof. As noted previously herein, the UE 115-*a* may perform the measurements on signals received within the measurement occasions 335-*a* in order to facilitate handover decisions at the UE 115-*a*. As such, the measurements may include received signal strength indicator (RSSI) measurements, reference signal received power (RSRP) measurements, reference signal received quality (RSRQ) measurements, channel quality indicator (CQI) measurements, SNR measurements, SINR measurements, or any combination thereof.

In some aspects, the UE 115-*b* may be configured to "tune away" from the first BWP 330-*a* during the set of measurement gaps 325-*a*, and may be configured to "tune back" to the first BWP 330-*a* to resume communications within the first BWP 330-*a* following an end of each respective measurement gap 325-*a*. In this regard, the UE 115-*a* may be configured to resume communications with the base station 105-a within the first BWP 330-a based on the first measurement gap configuration 320-a. For example, upon monitoring a measurement occasion 335-a of the first measurement gap configuration 320-a and receiving a downlink message (e.g., SSB) within the measurement occasion 335-a, the UE 115-a may tune back to the first BWP 330-a following an end of the measurement occasion 335-a in order to resume communications within the first BWP 330-a.

In some implementations, the UE 115-a may determine an expiration of a timer associated with the first measurement gap configuration 320-a, an expiration of a validity period associated with the first measurement gap configuration 320-a, or both. The expiration of the timer/validity period associated with the first measurement gap configuration 320-a may indicate for the UE 115-a to transition the first measurement gap configuration 320-a from the active state to the inactive state (e.g., indicate a transition from a connected mode to an inactive/idle mode). As noted previously herein, the control signaling 315, the downlink message 340-a, or both, may indicate a timer and/or validity period associated with the first measurement gap configuration 320-a. As such, the UE 115-a may be configured to determine an expiration of the timer/validity period based on the indication of the timer/validity period, a duration of the timer/validity period, a time at which the timer/validity period were initiated, or any combination thereof.

Following the expiration of the timer/validity period of the first measurement gap configuration 320-a, the UE 115-a may be configured to modify the first measurement gap configuration 320-a, communicate based on a different measurement gap configuration 320, or both. For example, upon identifying the expiration of the timer/validity period, the UE 115-a may modify the first measurement gap configuration 320-a such that the modified first measurement gap configuration 320-a includes fewer measurement gaps 325-a (e.g., zero measurement gaps), shorter measurement gaps 325-a, or both. The UE 115-a may subsequently communicate with the base station 105-a within the first BWP 330-a based on (e.g., in accordance with) the modified first measurement gap configuration 320-a. In other cases, the UE 115-a may switch from the first measurement gap configuration 320-a to a different measurement gap configuration 320 upon expiration of the timer/validity period, and may subsequently communicate with the base station 105-a within the first BWP 330-a based on (e.g., in accordance with) the new measurement gap configuration 320.

In some aspects, the UE 115-a may receive, from the base station 105-a, a downlink message 340-b (e.g., DCI message, MAC-CE message) which includes an indication of a second BWP 330-b for communications at the UE 115-a. In this regard, the downlink message 340-b may include an indication for the UE 1115-a to communicate in accordance with the second BWP 330-b. The downlink message 340-b may explicitly indicate for the UE 115-a to switch from the first BWP 330-a to the second BWP 330-b, may schedule a communication with the UE 115-a within the second BWP 330-b, or both.

As noted previously herein with respect to the downlink message 340-a indicating the first BWP 330-a, the downlink message 340-b may indicate one or more parameters associated with the second BWP 330-b and/or the second measurement gap configuration 320-b associated with the second BWP 330-b, including an activity state associated with the second measurement gap configuration 320-b, a timer and/or validity period for the second measurement gap configuration 320-b, and the like. As such, any discussion associated with the downlink message 340-a may apply to the downlink message 340-b, to the extent applicable.

The UE 115-a may switch from the first BWP 330-a to the second BWP 330-b based on receiving the downlink message 340-b indicating the second BWP 330-b. The UE 115-a may perform a BWP switching procedure to switch to the second BWP 330-b, which may include internal processing procedures, beam switching procedures, retuning of radio frequency components, or any combination thereof.

Subsequently, the UE 115-a may communicate with the base station 105-a during a second time interval (e.g., second slot, second set of slots) based on (e.g., within) the second BWP 330-b and based on the second measurement gap configuration 320-b. For example, the UE 115-a may transmit uplink communications to the base station 105-a within the second BWP 330-b and/or receive downlink communications from the base station 105-a within the second BWP 330-b.

In some cases, the UE 115-a may be configured to automatically switch to the second measurement gap configuration 320-b associated with (e.g., corresponding to) the second BWP 330-b upon switching to the second BWP 330-b. That is, the UE 115-a may be configured to perform communications in accordance with the second measurement gap configuration 320-b which is mapped to the second BWP 330-b without any additional indication of the second measurement gap configuration 320-b (e.g., without an indication of the second measurement gap configuration 320-b in the downlink message 340-b). For example, the UE 115-a may be configured to perform communications in accordance with the second measurement gap configuration 320-b in cases where the default activity state (e.g., default ON activity state, or default active state) has been pre-configured for the second measurement gap configuration 320-b associated with the second BWP 330-b.

In some aspects, the UE 115-a may be configured to perform any of the steps/features performed during the communications within the first BWP 330-a while performing the communications within the second BWP 330-b. For example, while communicating within the second BWP 330-b, the UE 115-a may suspend communications within the second BWP 330-b during the set of measurement gaps 325-b of the second measurement gap configuration 320-b in order to monitor the second set of measurement occasions 335-b which are outside of the second BWP 330-b. Similarly, the UE 115-a may be configured to determine and expiration of a timer and/or validity period associated with the second measurement gap configuration 320-b, as described previously herein.

Techniques described herein may improve measurement for signals received outside of an active BWP at the UE 115-a. In particular, by configuring the UE 115-a with multiple measurement gap configurations (e.g., on a per-BWP basis), techniques described herein may enable measurement gap configurations to be configured in accordance with one or more measurement object configurations. Configuring the UE 115-a with multiple measurement gap configurations may additionally improve throughput at the UE 115-a and the base station 105-a in cases where measurements need not be performed outside of the active BWP at the UE 115-a. Moreover, configuring measurement gap configurations on a per-BWP basis may prevent the need for a measurement gap configuration to be re-configured each time the switches between BWPs, which may reduce a latency of measurements performed at the UE 115-a and facilitate improved handover decisions at the UE 115-a.

Figure 4:
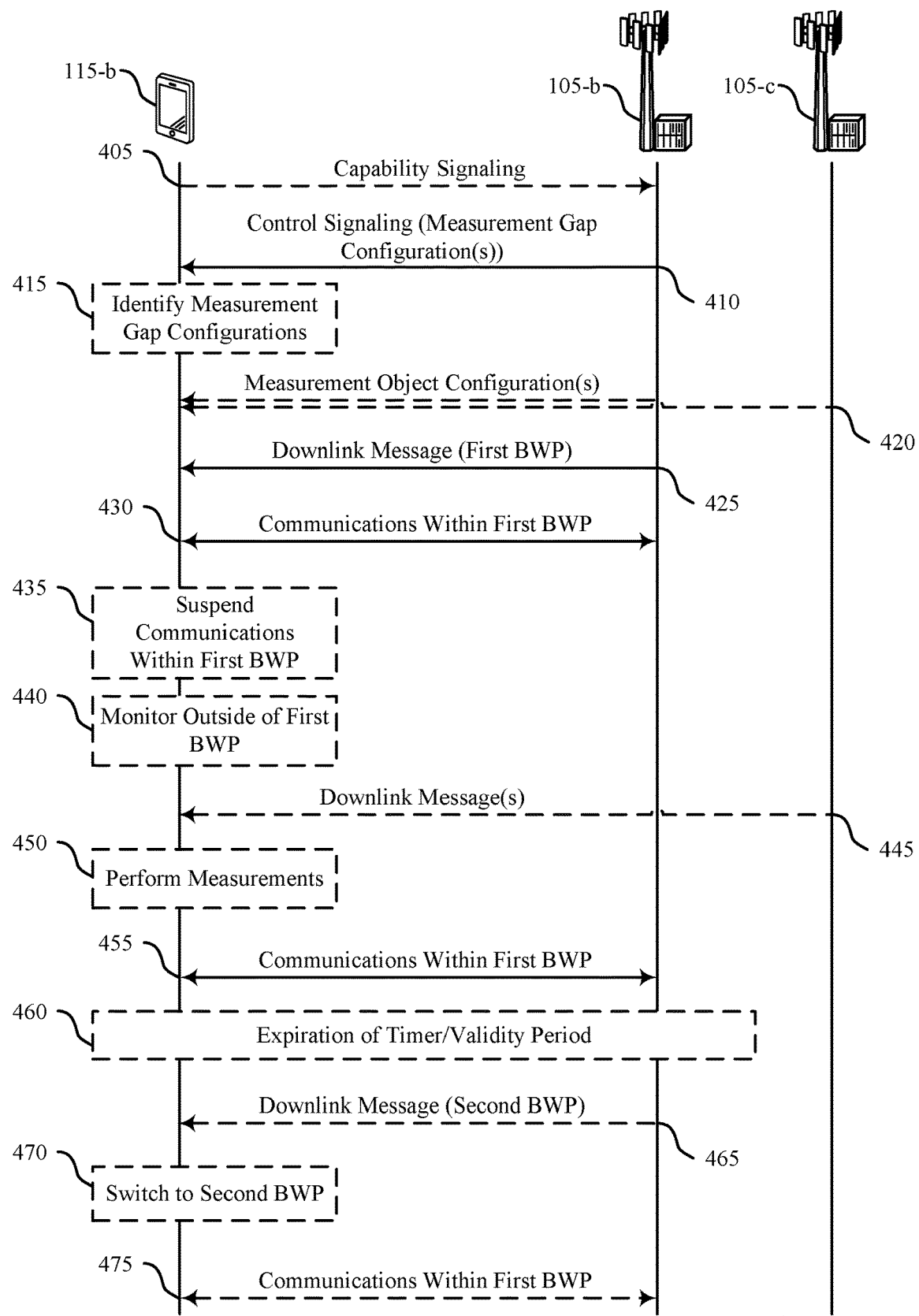
FIG. 4 illustrates an example of a process flow that supports techniques for measurement gap configurations in accordance with aspects of the present disclosure.

FIG. 4 illustrates an example of a process flow 400 that supports techniques for measurement gap configurations in accordance with aspects of the present disclosure. In some examples, process flow 400 may implement, or be implemented by, aspects of wireless communications systems 100, resource configuration 200, wireless communications system 300, or any combination thereof. For example, the process flow 400 may illustrate a UE 115-b receiving and/or identifying a first measurement gap configuration associated with a first BWP, receiving a downlink message indicating the first BWP, and communicating with a base station 105-b within the first BWP and based on the first measurement gap configuration, as described with reference to FIGS. 1-3.

In some cases, process flow 400 may include a UE 115-b, a first base station 105-b, and a second base station 105-c, which may be examples of corresponding devices as described herein. In particular, the UE 115-b and the base station 105-b illustrated in FIG. 6 may include examples of the UE 115-a and the base station 105-a illustrated in FIG. 3.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-b may transmit, to the first base station 105-a (e.g., PCell), capability signaling (e.g., UE capability message(s)) indicating one or more capabilities associated with configuring the UE 115-b with measurement gap configurations.

For example, the capability signaling may indicate whether the UE 115-b is capable of being configured with multiple measurement gap configurations on a per-BWP basis, a per-frequency range basis, a per-band basis, or any combination thereof. By way of another example, the capability signaling may indicate whether the UE 115-b supports a timer-based expiration mechanism for measurement gap configurations configured at the UE 115-b. Moreover, the capability signaling may indicate other implementation-specific limitations associated with configuring measurement gap configurations at the UE 115-b, such as a quantity of measurement gap configurations which may be associated with each respective BWP.

For instance, capability signaling may include an indication of a first capability of the UE 115-b to perform communications based on the first measurement gap configuration associated with a first BWP (e.g., capability to be configured with measurement gap configurations on a per-BWP basis), a second capability of the UE 115-b to support a set of measurement gap configurations associated with a single BWP a third capability of the UE 115-b to perform communications in accordance with a timer associated with a measurement gap configuration (e.g., capability to support timer-based expiration mechanism), or any combination thereof.

At 410, the UE 115-b may receive, from the first base station 105-b, control signaling which indicates one or more measurement gap configurations associated with one or more BWPs configured for communications at the UE 115-b. The control signaling may include an RRC message, a DCI message, a MAC-CE message, or both.

The one or more measurement gap configurations may be associated with measurements for communications at the UE 115-b over a frequency which is outside of the corresponding BWP in the frequency domain. As such, each measurement gap configuration may be associated with a measurement gap configuration index ($MG_{index}$), a BWP index ($BWP_{index}$) associated with the respective BWP to which the respective measurement gap configuration applies, a gap duration associated with a set of measurement gaps (gapConfig), a set of serving carriers associated with the respective BWP, a frequency range, an activity state (e.g., active state (ON), inactive state (OFF), default activity state), or any combination thereof. The activity state may be indicated via a binary (or non-binary) indicator indicating whether each respective measurement gap configuration is enabled (e.g., active state) or disabled (e.g., inactive state) per individual BWP.

Each measurement gap configuration may include one or more BWP indexes ($BWP_{index}$) which point to candidate BWPs, thereby linking the respective measurement gap configuration to the corresponding candidate BWPs. It is noted herein, however, that BWP indexes may not be necessary in cases where BWPs and measurement gap configurations are mapped in accordance with an implicit or pre-configured mapping. Each measurement gap configuration may indicate whether the measurement gap configuration applies to all serving carriers, to specific frequency ranges, and/or to specific UEs 115. Parameters associated with a measurement gap configuration may be specified to share the same or different values as legacy measurement gap configurations (MeasGapConfig).

In some implementations, the UE 115-b may receive the control signaling at 410 based on transmitting the capability signaling at 405. For example, in cases where the UE 115-b indicates a capability to be configured with multiple measurement gap configurations on a per-BWP basis, the control signaling may configure the UE 115-b with a set of measurement gap configurations on a per-BWP basis. By way of another example, in cases where the UE 115-b indicates a capability to support multiple measurement gap configurations associated with a single BWP, the control signaling may configure the UE 115-b with a set of measurement gap configurations which are each associated with a single BWP at the UE 115-b.

In some aspects, the control signaling may configure the UE 115-b with a set of measurement gap configurations which are associated with a set of BWPs at the UE 115-b. For example, in cases where the UE 115-b may be configured with a set of multiple BWPs 330, for example four BWPs, the control signaling may configure the UE 115-b with a set of four measurement gap configurations which correspond to the four respective BWPs (e.g., one-to-one mapping between measurement gap configurations and BWPs). In this regard, the control signaling may indicate a first measurement gap configuration associated with a first BWP, a second measurement gap configuration associated with a second BWP, and the like. In additional or alternative cases, a single measurement gap configuration may be associated with multiple BWPs. Similarly, in some cases, a single BWP may be associated with multiple measurement gap configurations which may be activated/deactivated independently and/or concurrently.

The control signaling may indicate one or more parameters associated with the measurement gap configurations, including timers associated with the respective measurement gap configurations, validity periods associated with the measurement gap configurations, or both. For example, the control signaling may configure the UE 115-b with a first measurement gap configuration associated with a first BWP at the UE 115-*b*, and may indicate a timer and/or a validity period associated with the measurement gap configuration. In this example, the timer may indicate a time duration during which the UE 115-*b* may be configured to perform communications according to the first measurement gap configuration, where the UE 115-*b* retires the first measurement gap configuration (e.g., transitions the first measurement gap configuration to an inactive state) following an expiration of the timer.

At 415, the UE 115-*b* may identify one or more measurement gap configurations configured at the UE 115-*b*. In some aspects, the UE 115-*b* may identify the measurement gap configurations at 415 based on the indication of the measurement gap configurations received via the control signaling (e.g., RRC signaling) at 410. Additionally, or alternatively, the UE 115-*b* may be configured (e.g., pre-configured) with the one or more measurement gap configurations, and may therefore be configured to identify the measurement gap configurations at 415 without the explicit control signaling at 410.

At 420, the UE 115-*b* may receive, from the first base station 105-*b* and/or the second base station 105-*c*, an indication of a measurement object configuration associated with a set of measurement occasions for performing measurements at the UE 115-*b*. In particular, the measurement object configuration may include a data structure which includes or indicates a configuration for measuring signals (e.g., SSBs) received from target cells (e.g., second base station 105-*c*), as shown and described in FIG. 2. The indication of the measurement object configuration may be received via an RRC message, a DCI message, a MAC-CE message, or any combination thereof. In some implementations, the control signaling received at 410 may include the indication of the measurement object configuration. In additional or alternative implementations, the UE 115-*b* may be pre-configured with one or more measurement object configurations.

At 425, the UE 115-*b* may receive, from the first base station 105-*b*, a downlink message (e.g., DCI message, MAC-CE message) which includes an indication of a first BWP for communications at the UE 115-*b*. In this regard, the downlink message may include an indication for the UE 1115-*b* to communicate in accordance with the first BWP. The downlink message may explicitly indicate for the UE 115-*b* to switch to the first BWP, may schedule a communication with the UE 115-*b* within the first BWP, or both.

The UE 115-*b* may receive the downlink message at 425 based on transmitting the capability signaling at 405, receiving the control signaling at 410, identifying the measurement gap configurations at 415, receiving the measurement object configuration at 420, or any combination thereof. In some implementations, the control signaling at 410, the indication of the measurement object configuration at 420, the downlink message at 425, or any combination thereof, may be received in the same communication. For example, in some cases, the UE 115-*b* may receive the control signaling at 410 and the downlink message at 425 via a same downlink communication (e.g., single RRC message, single DCI message).

The downlink message may include one or more parameters associated with the first BWP and/or measurement gap configurations associated with the first BWP, including an activity state associated with measurement gap configuration(s) for the first BWP, a timer and/or validity period for measurement gap configuration(s) for the first BWP, and the like. For example, the downlink message (e.g., DCI message) may include an indication of an activity state associated with the first measurement gap configuration associated with the first BWP. For instance, the downlink message may indicate an active state, and may thereby indicate for the UE 115-*b* to transition the first measurement gap configuration from an inactive state to the active state. In cases where the downlink message does not indicate an activity state for the first measurement gap configuration, the UE 115-*b* may be configured to follow a default activity state (which may be configured via the control signaling at 410) for the first measurement gap configuration to enable/disable the first measurement gap configuration.

In cases where the first BWP is associated with multiple measurement gap configurations, the downlink message may indicate which measurement gap configuration is to be used. For example, the first BWP may be configured with (e.g., associated with) a first measurement gap configuration and a second measurement gap configuration. In this example, the downlink message may include an indication of the first measurement gap configuration, the second measurement gap configuration, or both, thereby instructing the UE 115-*b* as to which measurement gap configuration should be used for the first BWP. In this example, in cases where the UE 115-*b* is to perform measurements in accordance with both the first and second measurement gap configurations (e.g., concurrent measurement gap configurations), the downlink message may indicate an active state for both the first and second measurement gap configurations.

In some implementations, the downlink message (e.g., DCI message, RRC message, MAC-CE message) may modify and/or reconfigure one or more parameters of a measurement gap configuration. In particular, the network (e.g., first base station 105-*b*) may keep track of measurement gap configurations, candidate BWPs, and/or measurement object configurations associated with the UE 115-*b*, and may be configured to modify/reconfigure the measurement gap configurations via control signaling (e.g., during RRC connection, during inactive states). For example, the downlink message may indicate one or more parameters associated with the first measurement gap configuration corresponding to the first BWP. In this example, the one or more parameters may define and/or selectively modify the first measurement gap configuration, including a gap length, a gap periodicity, a timer, a validity time, and the like.

The network (e.g., first base station 105-*b*) may employ different levels of signaling in order to modify/reconfigure the UE 115-*b* with updated parameters for measurement gap configurations. RRC signaling may be used to override and/or update parameters for measurement gap configurations for one or more candidate BWPs at the UE 115-*b*. In this regard, RRC signaling may be used to update mappings between measurement gap configurations and candidate BWPs simultaneously in order to avoid stale mappings. Comparatively, MAC-CE messages may be used to selectively update parameters for one or more measurement gap configurations. Moreover, DCI messages may be used to indicate a pattern/activity state (e.g., active state (ON), inactive state (OFF)) for the first measurement gap configuration associated with the first BWP upon switching to the first BWP.

At 430, the UE 115-*b* may communicate with the first base station 105-*b* during a first time interval (e.g., first slot, first set of slots) based on (e.g., within) the first BWP and based on the corresponding measurement gap configuration. For example, the UE 115-*b* may transmit uplink communications to the base station 105-*b* within the first BWP and/or receive downlink communications from the base station 105-*b* within the first BWP. The UE 115-*b* may communicate within the first BWP at 430 based on transmitting the capability signaling at 405, receiving the control signaling at 410, identifying the measurement gap configurations at 415, receiving the measurement object configuration at 420, receiving the downlink message at 425, or any combination thereof.

The UE 115-*b* may perform the communications at 430 based on (e.g., in accordance with) the one or more measurement gap configurations which correspond to the first BWP. For example, in cases where the first BWP is associated with a single measurement gap configuration, the UE 115-*b* may perform the communications at 430 based on (e.g., in accordance with) the single measurement gap configuration. In other cases where the first BWP is associated with multiple measurement gap configurations, the UE 115 may be configured to determine which measurement gap configuration to apply. For example, the first BWP may be associated with a first measurement gap configuration and a second measurement gap configuration. In this example, the UE 115-*b* may determine whether to apply the first measurement gap configuration, the second measurement gap configuration, or both (e.g., individual or concurrent measurement gap configurations) based on an indication from the base station 105-*b*, and may perform the communications at 430 based on the determined measurement gap configuration(s). In this example, the downlink message 425 may indicate whether the UE 115-*b* is to use the first and/or second measurement gap configuration associated with the first BWP.

At 435, the UE 115-*b* may suspend communications with the base station 105-*b* within the first BWP. In particular, the UE 115-*b* may suspend communications (e.g., suspend uplink/downlink communications) within the first BWP in accordance with the measurement gap configuration(s) associated with the first BWP. For example, in cases where the first BWP is associated with a first measurement gap configuration, the UE 115-*b* may suspend communications during/within a set of measurement gaps of the first measurement gap configuration. The UE 115-*b* may suspend communications by turning off or retuning radio frequency components, performing beam switching procedures, performing BWP switching procedures, or any combination thereof.

The UE 115-*b* may be configured to suspend communications within the first BWP in order to perform measurements on signals received outside of the first BWP (e.g., outside of the active BWP). In this regard, the UE 115-*b* may suspend data transfer within the first BWP to perform measurements in accordance with the measurement object configuration received/identified at 420.

At 440, the UE 115-*b* may monitor one or more measurement occasions associated with the configured measurement object configurations(s) received/identified at 420. In this regard, the UE 115-*b* may monitor measurement occasions which are associated with a frequency which is outside of the first BWP in the frequency domains. As such, the UE 115-*b* may perform the monitoring at 440 based on the respective measurement object configuration(s), suspending communications within the first BWP at 435, or both.

At 445, the UE 115-*b* may receive one or more messages within the set of measurement occasions. For example, as shown in FIG. 4, the UE 115-*b* may receive one or more messages (e.g., SSBs) from the second base station 105-*c*, where the messages are associated with a frequency which is outside of the first BWP in the frequency domain. In this example, the second base station 105-*c* may transmit the SSBs and the UE 115-*b* may receive the SSBs in order to facilitate handover decisions. The UE 115-*b* may receive the one or messages within the set of measurement occasions associated with the measurement object configuration received/identified at 420. As such, the UE 115-*b* may receive the messages (e.g., SSBs) at 445 based on the respective measurement object configuration(s), suspending communications within the first BWP at 435, monitoring the set of measurement occasions at 440, or any combination thereof.

At 450, the UE 115-*b* may perform measurements for the messages (e.g., SSBs) received at 445. The UE 115-*b* may perform the measurements based on the measurement gap configuration associated with the first BWP, the measurement object configurations, or both. Moreover, the UE 115-*b* may perform the measurements based on suspending communications within the first BWP at 435, monitoring the measurement occasions at 440, receiving the messages at 445, or any combination thereof. As noted previously herein, the UE 115-*b* may perform the measurements at 450 in order to facilitate handover decisions at the UE 115-*b*. As such, the measurements performed at 450 may include RSSI measurements, RSRP measurements, RSRQ measurements, CQI measurements, SNR measurements, SINR measurements, or any combination thereof.

At 455, the UE 115-*b* may resume communications with the first base station 105-*b* during based on (e.g., within) the first BWP and based on the corresponding measurement gap configuration. For example, upon monitoring a measurement occasion of the first measurement gap configuration and receiving a downlink message within the measurement occasion, the UE 115-*b* may tune back to the first BWP following an end of the measurement occasion in order to resume communications within the first BWP.

At 460, the UE 115-*b*, the first base station 105-*b*, or both, may determine an expiration of a timer associated with the first measurement gap configuration, an expiration of a validity period associated with the first measurement gap configuration, or both. The expiration of the timer/validity period associated with the first measurement gap configuration may indicate for the UE 115-*b* to transition the first measurement gap configuration from the active state to the inactive state (e.g., indicate a transition from a connected mode to an inactive/idle mode). As noted previously herein, the control signaling received at 410, the downlink message received at 425, or both, may indicate a timer and/or validity period associated with the first measurement gap configuration. As such, the UE 115-*b* and/or first base station 105-*b* may be configured to determine an expiration of the timer/validity period based on the indication of the timer/validity period, a duration of the timer/validity period, a time at which the timer/validity period were initiated, or any combination thereof.

Following the expiration of the timer/validity period of the first measurement gap configuration, the UE 115-*b* may be configured to modify the first measurement gap configuration, communicate based on a different measurement gap configuration, or both. For example, upon identifying the expiration of the timer/validity period, the UE 115-*b* may modify the first measurement gap configuration such that the modified first measurement gap configuration includes fewer measurement gaps (e.g., zero measurement gaps), shorter measurement gaps, or both. The UE 115-*b* may subsequently communicate with the base station 105-*b* within the first BWP based on (e.g., in accordance with) the modified first measurement gap configuration. In other cases, the UE 115-*b* may switch from the first measurement gap configuration to a different measurement gap configuration upon expiration of the timer/validity period, and may subsequently communicate with the base station 105-*b* within the first BWP based on (e.g., in accordance with) the new measurement gap configuration. Moreover, the UE 115-*b* may communicate with the base station 105-*b* based on the modified first measurement gap configuration and/or a different measurement gap configuration upon expiration of the timer/validity period based on indicating that the UE 115-*b* supports timer-based and/or validity period-based expiration mechanisms via the control signaling at 405.

At 465, the UE 115-*b* may receive, from the first base station 105-*b*, a downlink message (e.g., DCI message, MAC-CE message) which includes an indication of a second BWP for communications at the UE 115-*b*. In this regard, the downlink message may include an indication for the UE 1115-*b* to communicate in accordance with the second BWP. The downlink message may explicitly indicate for the UE 115-*b* to switch from the first BWP to the second BWP, may schedule a communication with the UE 115-*b* within the second BWP, or both.

As noted previously herein with respect to the downlink message received at 425, the downlink message received at 465 may indicate one or more parameters associated with the second BWP and/or measurement gap configurations associated with the second BWP, including an activity state associated with measurement gap configuration(s) for the second BWP, a timer and/or validity period for measurement gap configuration(s) for the second BWP, and the like. As such, any discussion associated with the downlink message received at 425 may apply to the downlink message received at 465, to the extent applicable.

At 470, the UE 115-*b* may switch from the first BWP to the second BWP. In some aspects, the UE 115-*b* may switch from the first BWP to the second BWP based on receiving the downlink message indicating the second BWP at 465. The UE 115-*b* may perform a BWP switching procedure to switch to the second BWP, which may include internal processing procedures, beam switching procedures, retuning of radio frequency components, or any combination thereof.

At 475, the UE 115-*b* may communicate with the first base station 105-*b* during a second time interval (e.g., second slot, second set of slots) based on (e.g., within) the second BWP and based on the corresponding measurement gap configuration. For example, the UE 115-*b* may transmit uplink communications to the base station 105-*b* within the second BWP and/or receive downlink communications from the base station 105-*b* within the second BWP. The UE 115-*b* may communicate within the second BWP at 475 based on transmitting the capability signaling at 405, receiving the control signaling at 410, identifying the measurement gap configurations at 415, receiving the measurement object configuration at 420, receiving the downlink message at 465, switching to the second BWP at 470, or any combination thereof.

In some cases, the UE 115-*b* may be configured to automatically switch to the second measurement gap configuration associated with (e.g., corresponding to) the second BWP upon switching to the second BWP. That is, the UE 115-*b* may be configured to perform communications in accordance with the second measurement gap configuration which is mapped to the second BWP without any additional indication of the second measurement gap configuration (e.g., without an indication of the second measurement gap configuration in the downlink message at 465).

In some aspects, the UE 115-*b* may be configured to perform any of the steps/features of process flow 400 while communicating within the second BWP. In particular, the UE 115-*b* may be configured to perform any of steps 435 through 460 in the context of communicating within the second BWP. For example, while communicating within the second BWP, the UE 115-*b* may suspend communications within the second BWP as shown and described at 435, monitor measurement occasions outside of the second BWP as shown and described at 440, and the like. Similarly, the UE 115-*b* may be configured to determine and expiration of a timer and/or validity period associated with the second measurement gap configuration as shown and described at 460.

Techniques described herein may improve measurement for signals received outside of an active BWP at the UE 115-*b*. In particular, by configuring the UE 115-*b* with multiple measurement gap configurations (e.g., on a per-BWP basis), techniques described herein may enable measurement gap configurations to be configured in accordance with one or more measurement object configurations. Configuring the UE 115-*b* with multiple measurement gap configurations may additionally improve throughput at the UE 115 and the base station 105-*b* in cases where measurements need not be performed outside of the active BWP at the UE 115-*b*. Moreover, configuring measurement gap configurations on a per-BWP basis may prevent the need for a measurement gap configuration to be re-configured each time the switches between BWPs, which may reduce a latency of measurements performed at the UE 115-*b* and facilitate improved handover decisions at the UE 115-*b*.

Figure 5:
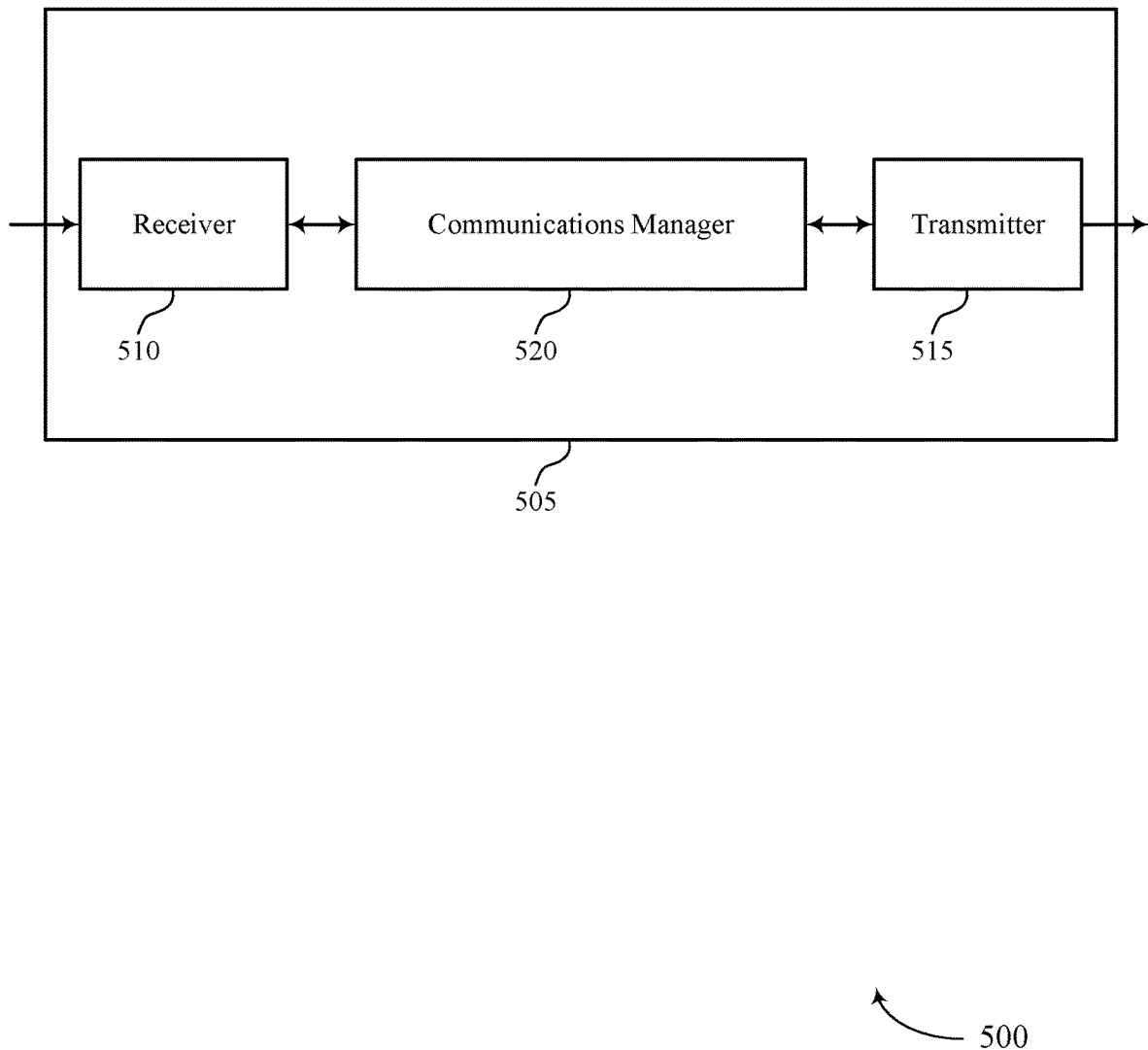
FIGS. 5 and 6 show block diagrams of devices that support techniques for measurement gap configurations in accordance with aspects of the present disclosure.

FIG. 5 shows a block diagram 500 of a device 505 that supports techniques for measurement gap configurations in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for measurement gap configurations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for measurement gap configurations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for measurement gap configurations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, control signaling including an indication of a first measurement gap configuration associated with a first BWP and associated with measurements for communications at the UE over a frequency outside of the first BWP in a frequency domain. The communications manager 520 may be configured as or otherwise support a means for receiving, from the base station, a downlink message including an indication of the first BWP. The communications manager 520 may be configured as or otherwise support a means for communicating with the base station during a first time interval based on the indication of the first measurement gap configuration and the indication of the first BWP.

By including or configuring the communications manager 520 in accordance with examples as described herein, the device 505 (e.g., a processor controlling or otherwise coupled to the receiver 510, the transmitter 515, the communications manager 520, or a combination thereof) may improve measurement for signals received outside of an active BWP at the UE 115. In particular, by configuring the UE 115 with multiple measurement gap configurations (e.g., on a per-BWP basis), techniques described herein may enable measurement gap configurations to be configured in accordance with one or more measurement object configurations. Configuring the UE 115 with multiple measurement gap configurations may additionally improve throughput at the UE 115 and the base station 105 in cases where measurements need not be performed outside of the active BWP at the UE 115. Moreover, configuring measurement gap configurations on a per-BWP basis may prevent the need for a measurement gap configuration to be re-configured each time the switches between BWPs, which may reduce a latency of measurements performed at the UE 115 and facilitate improved handover decisions at the UE 115.

Figure 6:
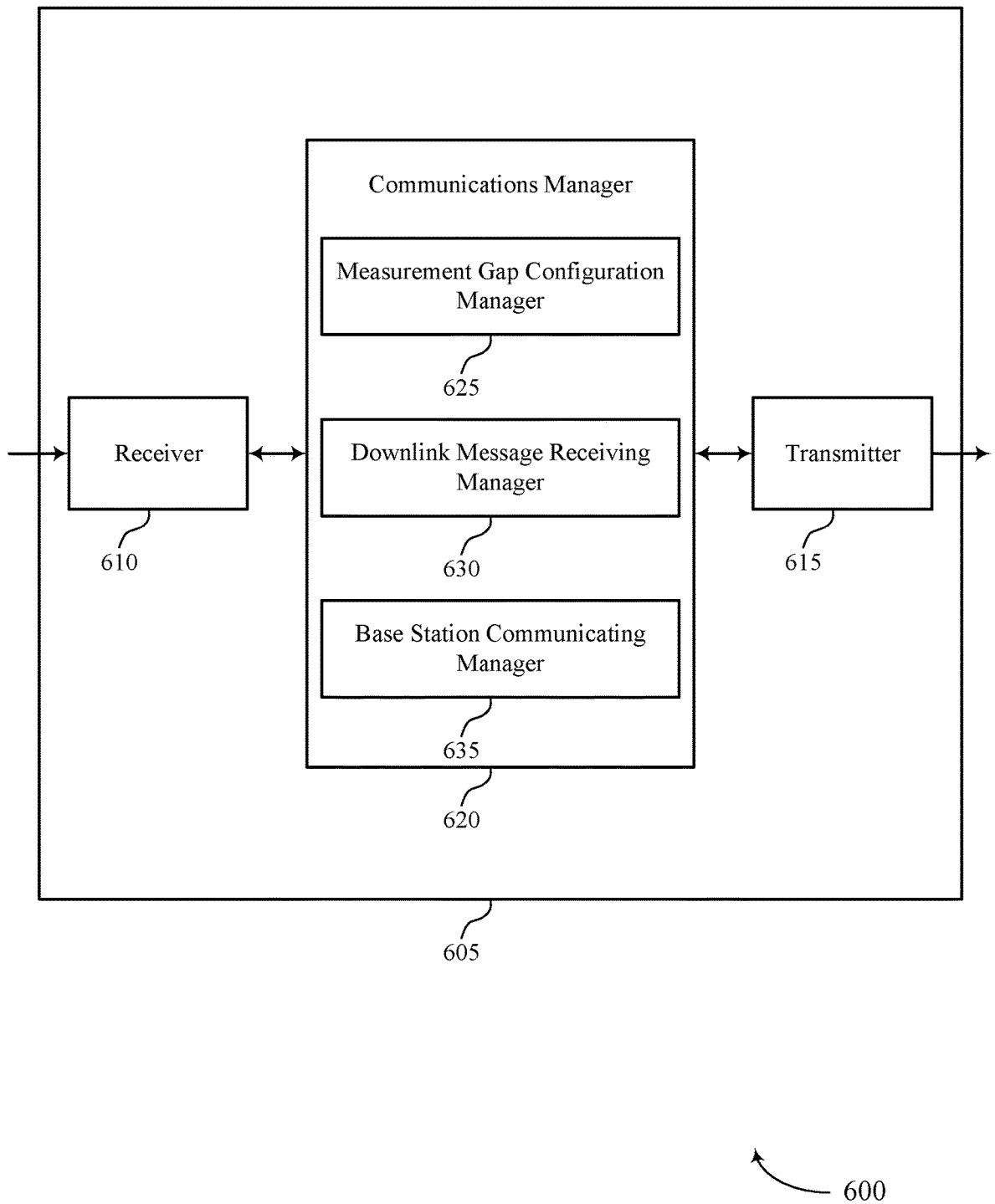

FIG. 6 shows a block diagram 600 of a device 605 that supports techniques for measurement gap configurations in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for measurement gap configurations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for measurement gap configurations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for measurement gap configurations as described herein. For example, the communications manager 620 may include a measurement gap configuration manager 625, a downlink message receiving manager 630, a base station communicating manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The measurement gap configuration manager 625 may be configured as or otherwise support a means for receiving, from a base station, control signaling including an indication of a first measurement gap configuration associated with a first BWP and associated with measurements for communications at the UE over a frequency outside of the first BWP in a frequency domain. The downlink message receiving manager 630 may be configured as or otherwise support a means for receiving, from the base station, a downlink message including an indication of the first BWP. The base station communicating manager 635 may be configured as or otherwise support a means for communicating with the base station during a first time interval based on the indication of the first measurement gap configuration and the indication of the first BWP.

Figure 7:
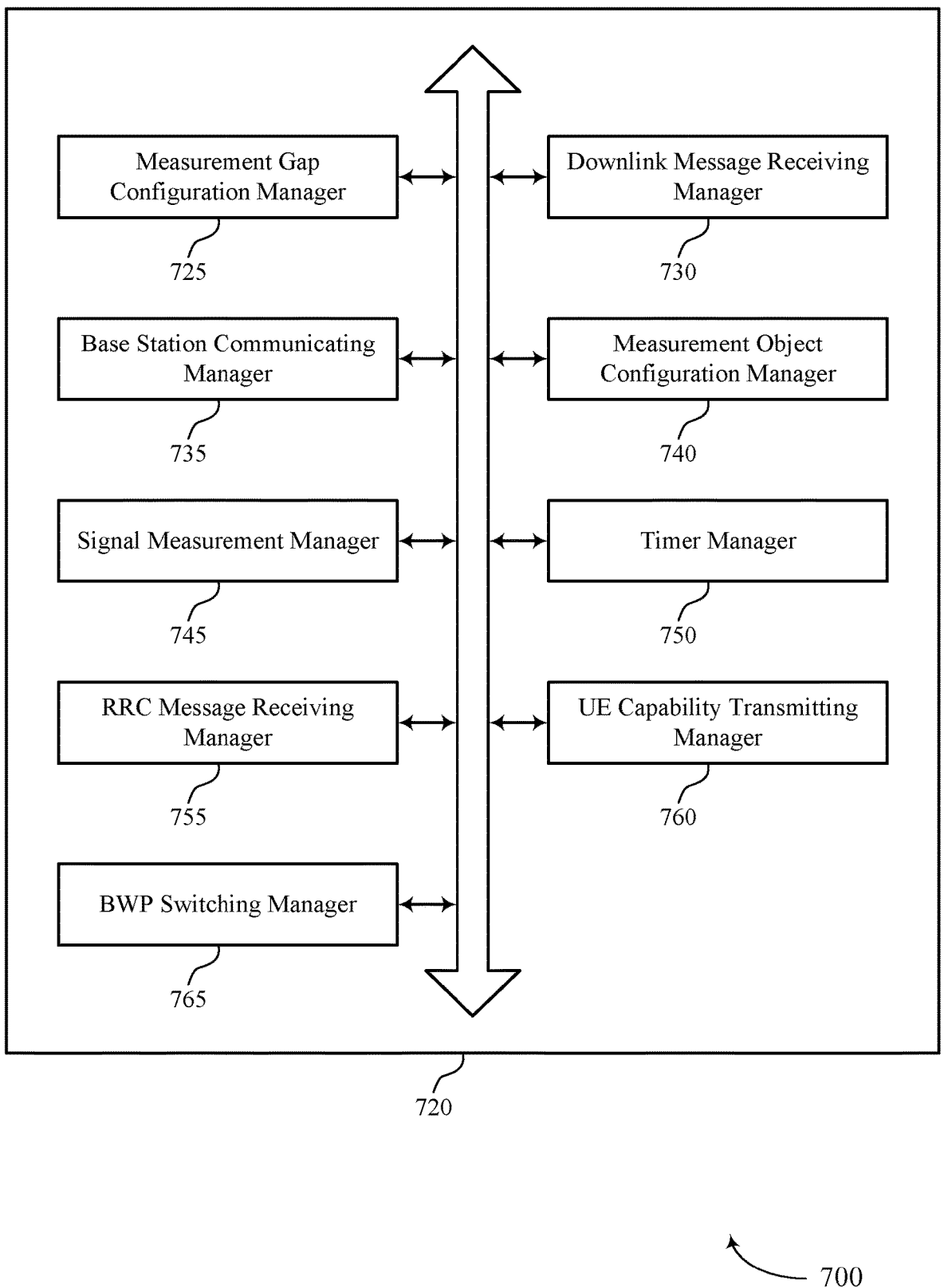
FIG. 7 shows a block diagram of a communications manager that supports techniques for measurement gap configurations in accordance with aspects of the present disclosure.

FIG. 7 shows a block diagram 700 of a communications manager 720 that supports techniques for measurement gap configurations in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for measurement gap configurations as described herein. For example, the communications manager 720 may include a measurement gap configuration manager 725, a downlink message receiving manager 730, a base station communicating manager 735, a measurement object configuration manager 740, a signal measurement manager 745, a timer manager 750, an RRC message receiving manager 755, a UE capability transmitting manager 760, a BWP switching manager 765, or any combination thereof. Each of these components may communicate, directly or indirectly, with one another (e.g., via one or more buses).

The communications manager 720 may support wireless communication at a UE in accordance with examples as disclosed herein. The measurement gap configuration manager 725 may be configured as or otherwise support a means for receiving, from a base station, control signaling including an indication of a first measurement gap configuration associated with a first BWP and associated with measurements for communications at the UE over a frequency outside of the first BWP in a frequency domain. The downlink message receiving manager 730 may be configured as or otherwise support a means for receiving, from the base station, a downlink message including an indication of the first BWP. The base station communicating manager 735 may be configured as or otherwise support a means for communicating with the base station during a first time interval based on the indication of the first measurement gap configuration and the indication of the first BWP.

In some examples, the measurement gap configuration manager 725 may be configured as or otherwise support a means for receiving an indication of a second measurement gap configuration associated with a second BWP. In some examples, the downlink message receiving manager 730 may be configured as or otherwise support a means for receiving, from the base station, a second downlink message including an indication of the second BWP. In some examples, the base station communicating manager 735 may be configured as or otherwise support a means for communicating with the base station during a second time interval based on the indication of the second measurement gap configuration and the indication of the second BWP.

In some examples, the measurement object configuration manager 740 may be configured as or otherwise support a means for receiving an indication of a measurement object configuration associated with a set of multiple measurement occasions for performing measurements at the UE. In some examples, the signal measurement manager 745 may be configured as or otherwise support a means for receiving one or more messages during the set of multiple measurement occasions and associated with the frequency. In some examples, the signal measurement manager 745 may be configured as or otherwise support a means for performing measurements for the one or more messages based on the first measurement gap configuration, where communicating with the base station during the first time interval is based on performing the measurements.

In some examples, the base station communicating manager 735 may be configured as or otherwise support a means for suspending communications with the base station within the first BWP based on the first measurement gap configuration. In some examples, the signal measurement manager 745 may be configured as or otherwise support a means for monitoring the one or more measurement occasions based on suspending the communications within the first BWP, where receiving the one or more messages is based on the monitoring.

In some examples, the timer manager 750 may be configured as or otherwise support a means for determining an expiration of a timer associated with the first measurement gap configuration, an expiration of a validity period associated with the first measurement gap configuration, or both. In some examples, the base station communicating manager 735 may be configured as or otherwise support a means for communicating with the base station during a second time interval based on a modified first measurement gap configuration or a second measurement gap configuration based on the expiration of the timer, the expiration of the validity period, or both.

In some examples, the timer manager 750 may be configured as or otherwise support a means for receiving, via the control signaling, an indication of the timer, an indication of the validity period or both, where determining the expiration of the timer, the expiration of the validity period, or both is based on the indication of the timer, the validity period, or both.

In some examples, the UE capability transmitting manager 760 may be configured as or otherwise support a means for transmitting, to the base station, an indication of a capability of the UE to perform communications based on the timer, where communicating with the base station during the first time interval based on the modified first measurement gap configuration or the second measurement gap configuration is based on the indication of the capability.

In some examples, the measurement gap configuration manager 725 may be configured as or otherwise support a means for receiving, via the control signaling, an indication of a second measurement gap configuration associated with the first BWP. In some examples, the measurement gap configuration manager 725 may be configured as or otherwise support a means for determining to perform communications based on the first measurement gap configuration or the second measurement gap configuration, where communicating with the base station during the first time interval is performed based on the determined measurement gap configuration.

In some examples, the downlink message receiving manager 730 may be configured as or otherwise support a means for receiving, via the downlink message, an indication of the first measurement gap configuration or the second measurement gap configuration, where determining to perform the communications based on the first measurement gap configuration or the second measurement gap configuration is based on the indication of the first measurement gap configuration or the second measurement gap configuration.

In some examples, the UE capability transmitting manager 760 may be configured as or otherwise support a means for transmitting, to the base station, an indication of a capability of the UE to support a set of multiple measurement gap configurations associated with the first BWP, where receiving the control signaling, receiving the downlink message, communicating with the base station during the first time interval, or any combination thereof, is based on the indication of the capability.

In some examples, the control signaling includes a RRC message, and the RRC message receiving manager 755 may be configured as or otherwise support a means for receiving, via the RRC message, an indication of a set of multiple measurement gap configurations associated with a set of multiple BWPs for communications at the UE, where the set of multiple measurement gap configurations include the first measurement gap configuration, and where the set of multiple BWPs include the first BWP.

In some examples, each measurement gap configuration of the set of multiple measurement gap configurations corresponds to a respective BWP of the set of multiple BWPs.

In some examples, the BWP switching manager 765 may be configured as or otherwise support a means for switching from the first BWP to a second BWP. In some examples, the base station communicating manager 735 may be configured as or otherwise support a means for communicating with the base station during a second time interval based on switching from the first BWP to the second BWP and based on a second measurement gap configuration of the set of multiple measurement gap configurations that corresponds to the second BWP.

In some examples, the downlink message includes a DCI message, a MAC-CE message, an RRC message, or any combination thereof.

In some examples, the downlink message receiving manager 730 may be configured as or otherwise support a means for receiving, via the downlink message, an indication of an activity state associated with the first measurement gap configuration, the activity state including one of an active state or an inactive state, where communicating with the base station during the first time interval is performed based on the activity state.

In some examples, the downlink message receiving manager 730 may be configured as or otherwise support a means for receiving, via the downlink message, an indication of one or more parameters associated with the first measurement gap configuration, where communicating with the base station during the first time interval is performed based on the one or more parameters.

In some examples, the control signaling and the downlink message are received via a same downlink communication.

In some examples, the first measurement gap configuration includes a BWP index associated with the first BWP, a periodicity associated with a set of multiple measurement gaps, a gap duration associated with the set of multiple measurement gaps, a set of serving carriers associated with the first measurement gap configuration, a frequency range associated with the first measurement gap configuration, or any combination thereof.

In some examples, the UE capability transmitting manager 760 may be configured as or otherwise support a means for transmitting, to the base station, an indication of a capability of the UE to perform communications based on the first measurement gap configuration associated with the first BWP, where receiving the control signaling, receiving the downlink message, communicating with the base station during the first time interval, or any combination thereof, is based on the indication of the capability.

Figure 8:
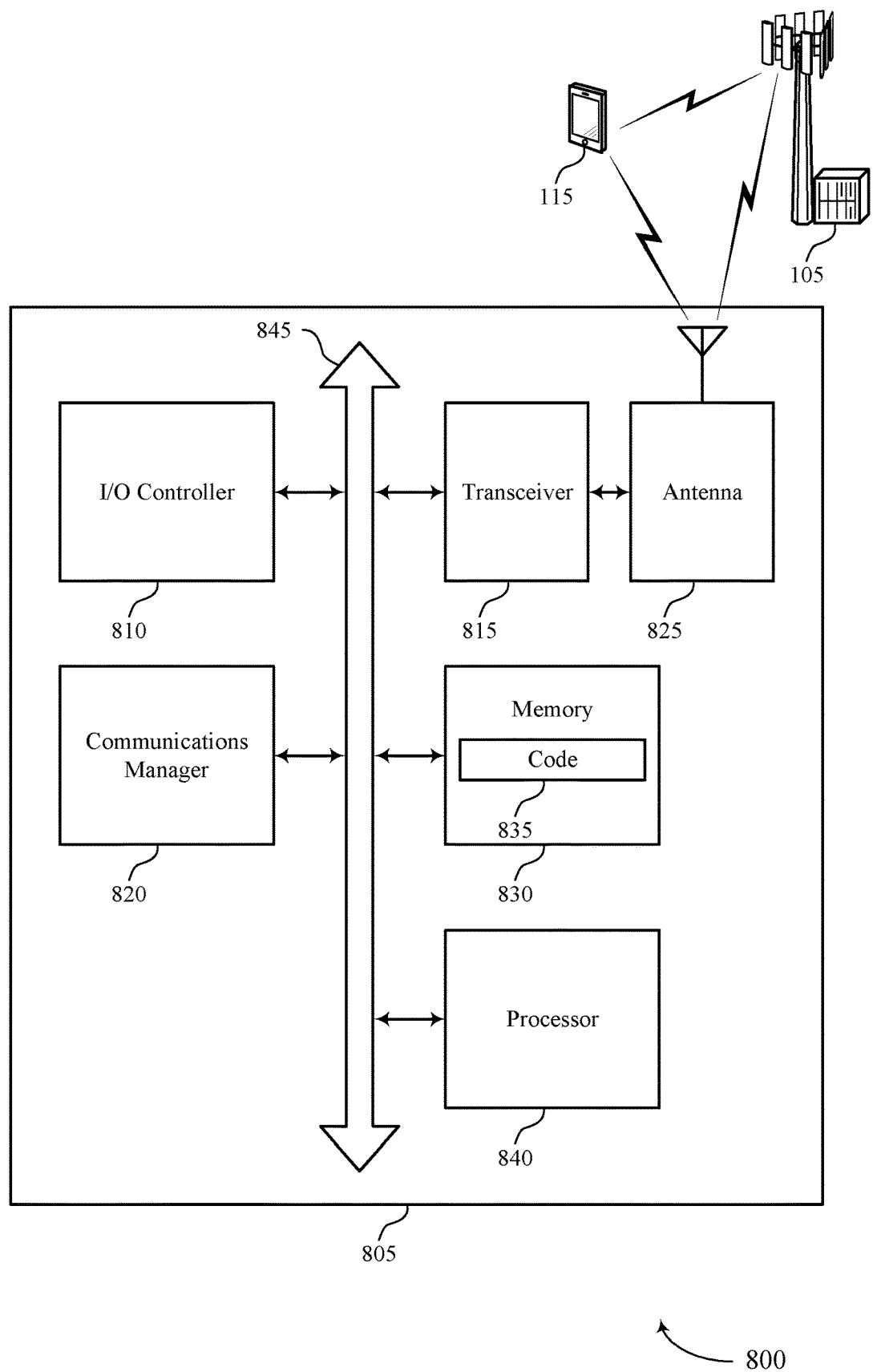
FIG. 8 shows a diagram of a system including a device that supports techniques for measurement gap configurations in accordance with aspects of the present disclosure.

FIG. 8 shows a diagram of a system 800 including a device 805 that supports techniques for measurement gap configurations in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for measurement gap configurations). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, control signaling including an indication of a first measurement gap configuration associated with a first BWP and associated with measurements for communications at the UE over a frequency outside of the first BWP in a frequency domain. The communications manager 820 may be configured as or otherwise support a means for receiving, from the base station, a downlink message including an indication of the first BWP. The communications manager 820 may be configured as or otherwise support a means for communicating with the base station during a first time interval based on the indication of the first measurement gap configuration and the indication of the first BWP.

By including or configuring the communications manager 820 in accordance with examples as described herein, the device 805 may improve measurement for signals received outside of an active BWP at the UE 115. In particular, by configuring the UE 115 with multiple measurement gap configurations (e.g., on a per-BWP basis), techniques described herein may enable measurement gap configurations to be configured in accordance with one or more measurement object configurations. Configuring the UE 115 with multiple measurement gap configurations may additionally improve throughput at the UE 115 and the base station 105 in cases where measurements need not be performed outside of the active BWP at the UE 115. Moreover, configuring measurement gap configurations on a per-BWP basis may prevent the need for a measurement gap configuration to be re-configured each time the switches between BWPs, which may reduce a latency of measurements performed at the UE 115 and facilitate improved handover decisions at the UE 115.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for measurement gap configurations as described herein, or the processor 840 and the memory 830 may be otherwise configured to perform or support such operations.

Figure 9:
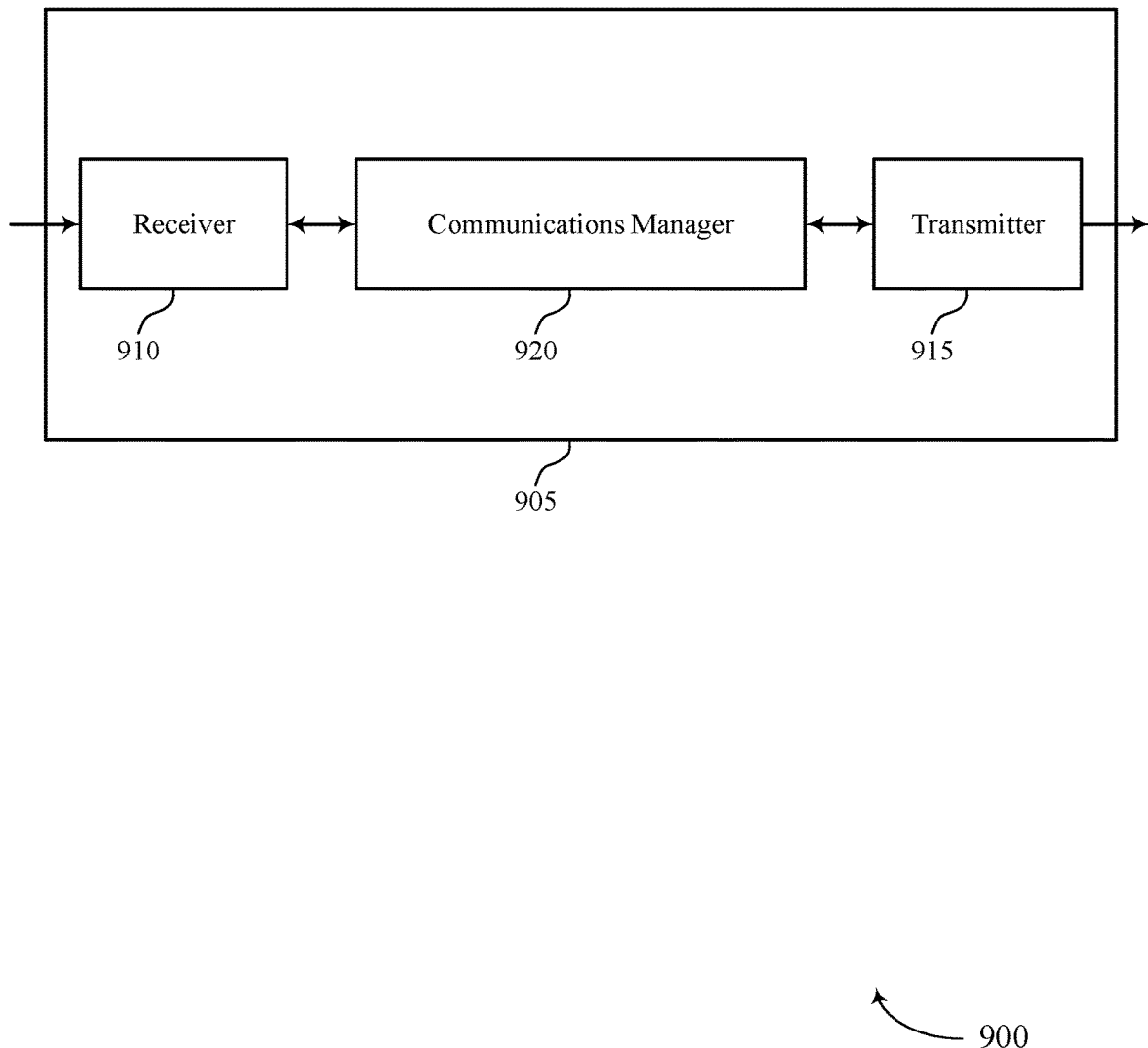
FIGS. 9 and 10 show block diagrams of devices that support techniques for measurement gap configurations in accordance with aspects of the present disclosure.

FIG. 9 shows a block diagram 900 of a device 905 that supports techniques for measurement gap configurations in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for measurement gap configurations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for measurement gap configurations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for measurement gap configurations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, control signaling including an indication of a first measurement gap configuration associated with a first BWP and associated with measurements for communications at the UE over a frequency outside of the first BWP in a frequency domain. The communications manager 920 may be configured as or otherwise support a means for transmitting, to the UE, a downlink message including an indication of the first BWP. The communications manager 920 may be configured as or otherwise support a means for communicating with the UE during a first time interval based on the indication of the first measurement gap configuration and the indication of the first BWP.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improve measurement for signals received outside of an active BWP at the UE 115. In particular, by configuring the UE 115 with multiple measurement gap configurations (e.g., on a per-BWP basis), techniques described herein may enable measurement gap configurations to be configured in accordance with one or more measurement object configurations. Configuring the UE 115 with multiple measurement gap configurations may additionally improve throughput at the UE 115 and the base station 105 in cases where measurements need not be performed outside of the active BWP at the UE 115. Moreover, configuring measurement gap configurations on a per-BWP basis may prevent the need for a measurement gap configuration to be re-configured each time the switches between BWPs, which may reduce a latency of measurements performed at the UE 115 and facilitate improved handover decisions at the UE 115.

Figure 10:
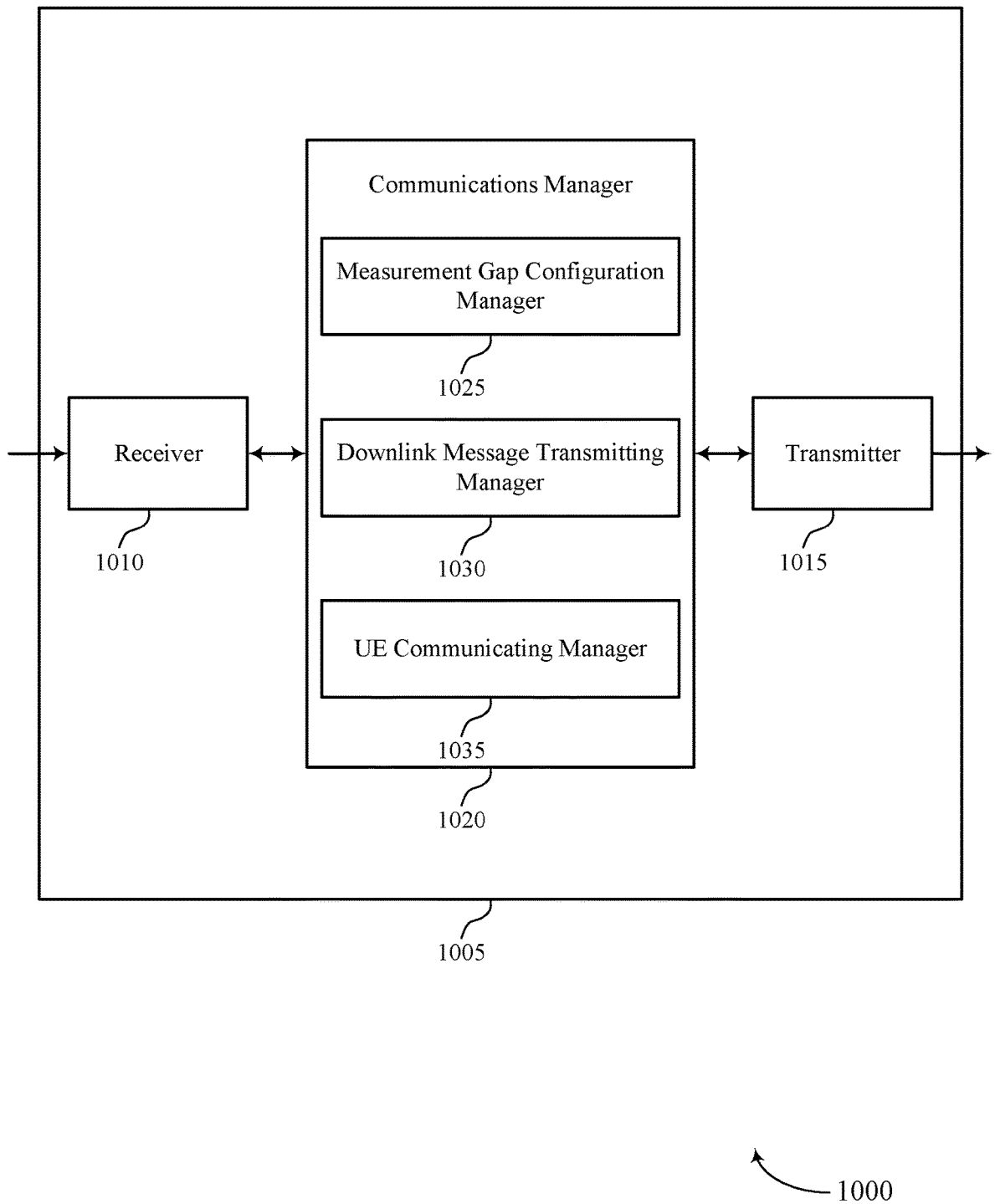

FIG. 10 shows a block diagram 1000 of a device 1005 that supports techniques for measurement gap configurations in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for measurement gap configurations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for measurement gap configurations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for measurement gap configurations as described herein. For example, the communications manager 1020 may include a measurement gap configuration manager 1025, a downlink message transmitting manager 1030, a UE communicating manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The measurement gap configuration manager 1025 may be configured as or otherwise support a means for transmitting, to a UE, control signaling including an indication of a first measurement gap configuration associated with a first BWP and associated with measurements for communications at the UE over a frequency outside of the first BWP in a frequency domain. The downlink message transmitting manager 1030 may be configured as or otherwise support a means for transmitting, to the UE, a downlink message including an indication of the first BWP. The UE communicating manager 1035 may be configured as or otherwise support a means for communicating with the UE during a first time interval based on the indication of the first measurement gap configuration and the indication of the first BWP.

Figure 11:
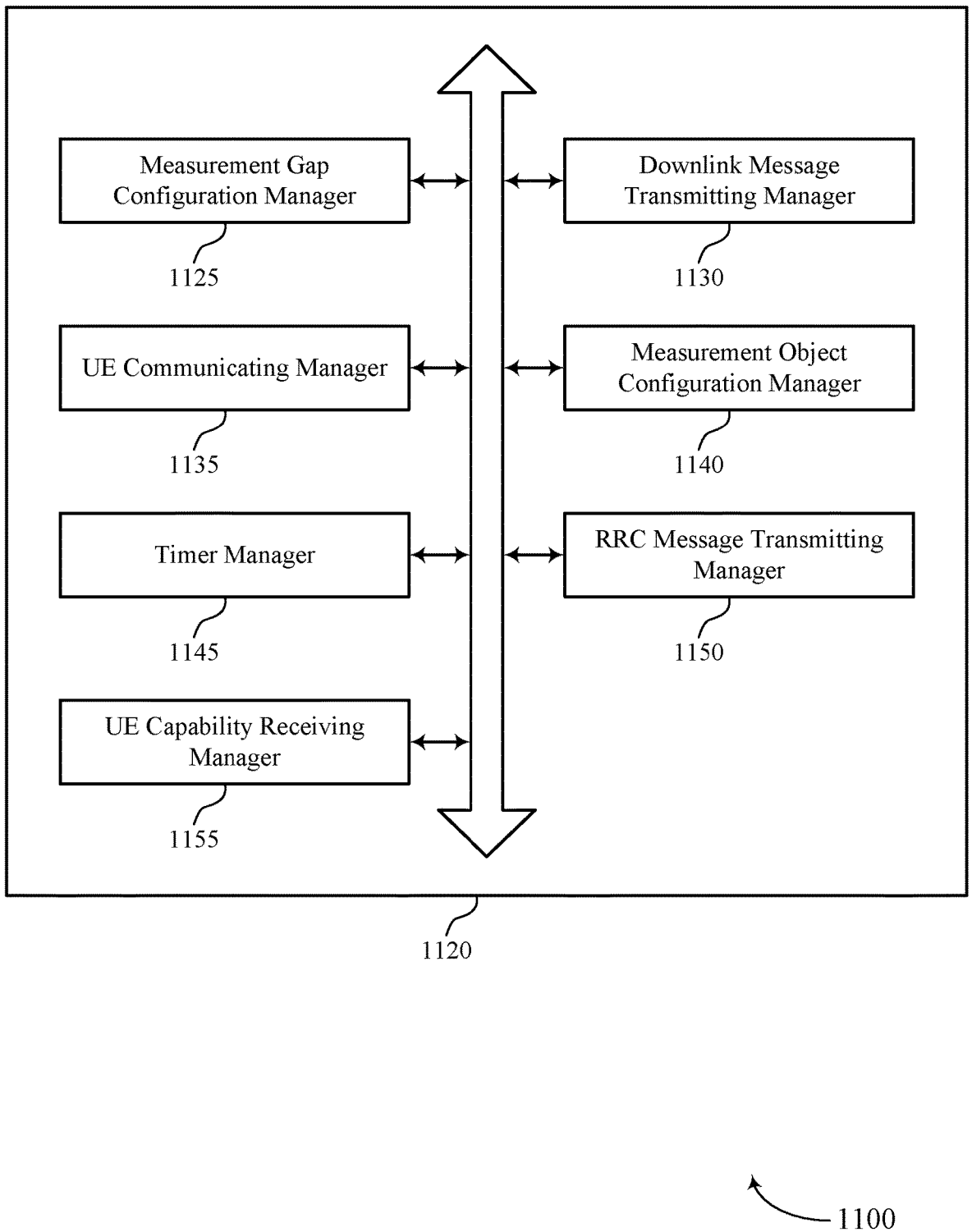
FIG. 11 shows a block diagram of a communications manager that supports techniques for measurement gap configurations in accordance with aspects of the present disclosure.

FIG. 11 shows a block diagram 1100 of a communications manager 1120 that supports techniques for measurement gap configurations in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for measurement gap configurations as described herein. For example, the communications manager 1120 may include a measurement gap configuration manager 1125, a downlink message transmitting manager 1130, a UE communicating manager 1135, a measurement object configuration manager 1140, a timer manager 1145, an RRC message transmitting manager 1150, a UE capability receiving manager 1155, or any combination thereof. Each of these components may communicate, directly or indirectly, with one another (e.g., via one or more buses).

The communications manager 1120 may support wireless communication at a base station in accordance with examples as disclosed herein. The measurement gap configuration manager 1125 may be configured as or otherwise support a means for transmitting, to a UE, control signaling including an indication of a first measurement gap configuration associated with a first BWP and associated with measurements for communications at the UE over a frequency outside of the first BWP in a frequency domain. The downlink message transmitting manager 1130 may be configured as or otherwise support a means for transmitting, to the UE, a downlink message including an indication of the first BWP. The UE communicating manager 1135 may be configured as or otherwise support a means for communicating with the UE during a first time interval based on the indication of the first measurement gap configuration and the indication of the first BWP.

In some examples, the measurement gap configuration manager 1125 may be configured as or otherwise support a means for transmitting, to the UE, an indication of a second measurement gap configuration associated with a second BWP. In some examples, the downlink message transmitting manager 1130 may be configured as or otherwise support a means for transmitting, to the UE, a second downlink message including an indication of the second BWP. In some examples, the UE communicating manager 1135 may be configured as or otherwise support a means for communicating with the UE during a second time interval based on the indication of the second measurement gap configuration and the indication of the second BWP.

In some examples, the measurement object configuration manager 1140 may be configured as or otherwise support a means for transmitting an indication of a measurement object configuration associated with a set of multiple measurement occasions for performing measurements at the UE, where communicating with the UE during the first time interval is based on the indication of the measurement object configuration.

In some examples, the timer manager 1145 may be configured as or otherwise support a means for determining an expiration of a timer associated with the first measurement gap configuration, an expiration of a validity period associated with the first measurement gap configuration, or both. In some examples, the UE communicating manager 1135 may be configured as or otherwise support a means for communicating with the UE during a second time interval based on a modified first measurement gap configuration or a second measurement gap configuration based on the expiration of the timer, the expiration of the validity period, or both.

In some examples, the timer manager 1145 may be configured as or otherwise support a means for transmitting, via the control signaling, an indication of the timer, an indication of the validity period or both, where determining the expiration of the timer, the expiration of the validity period, or both is based on the indication of the timer, the validity period, or both.

In some examples, the UE capability receiving manager 1155 may be configured as or otherwise support a means for receiving, from the UE, an indication of a capability of the UE to perform communications based on the timer, where communicating with the UE during the first time interval based on the modified first measurement gap configuration or the second measurement gap configuration is based on the indication of the capability.

In some examples, the measurement gap configuration manager 1125 may be configured as or otherwise support a means for transmitting, via the control signaling, an indication of a second measurement gap configuration associated with the first BWP. In some examples, the UE communicating manager 1135 may be configured as or otherwise support a means for determining to perform communications based on the first measurement gap configuration or the second measurement gap configuration, where communicating with the UE during the first time interval is performed based on the determined measurement gap configuration.

In some examples, the downlink message transmitting manager 1130 may be configured as or otherwise support a means for transmitting, via the downlink message, an indication of the first measurement gap configuration or the second measurement gap configuration, where determining to perform the communications based on the first measurement gap configuration or the second measurement gap configuration is based on the indication of the first measurement gap configuration or the second measurement gap configuration.

In some examples, the UE capability receiving manager 1155 may be configured as or otherwise support a means for receiving, from the UE, an indication of a capability of the UE to support a set of multiple measurement gap configurations associated with the first BWP, where transmitting the control signaling, transmitting the downlink message, communicating with the UE during the first time interval, or any combination thereof, is based on the indication of the capability.

In some examples, the control signaling includes a RRC message, and the RRC message transmitting manager 1150 may be configured as or otherwise support a means for transmitting, via the RRC message, an indication of a set of multiple measurement gap configurations associated with a set of multiple BWPs for communications at the UE, where the set of multiple measurement gap configurations include the first measurement gap configuration, and where the set of multiple BWPs include the first BWP.

In some examples, the downlink message includes a DCI message, a MAC-CE message, an RRC message, or any combination thereof.

In some examples, the downlink message transmitting manager 1130 may be configured as or otherwise support a means for transmitting, via the downlink message, an indication of an activity state associated with the first measurement gap configuration, the activity state including one of an active state or an inactive state, where communicating with the UE during the first time interval is performed based on the activity state.

In some examples, the downlink message transmitting manager 1130 may be configured as or otherwise support a means for transmitting, via the downlink message, an indication of one or more parameters associated with the first measurement gap configuration, where communicating with the UE during the first time interval is performed based on the one or more parameters.

In some examples, the control signaling and the downlink message are received via a same downlink communication.

In some examples, the first measurement gap configuration includes a BWP index associated with the first BWP, a periodicity associated with a set of multiple measurement gaps, a gap duration associated with the set of multiple measurement gaps, a set of serving carriers associated with the first measurement gap configuration, a frequency range associated with the first measurement gap configuration, or any combination thereof.

In some examples, the UE capability receiving manager 1155 may be configured as or otherwise support a means for receiving, from the UE, an indication of a capability of the UE to perform communications based on the first measurement gap configuration associated with the first BWP, where transmitting the control signaling, transmitting the downlink message, communicating with the UE during the first time interval, or any combination thereof, is based on the indication of the capability.

Figure 12:
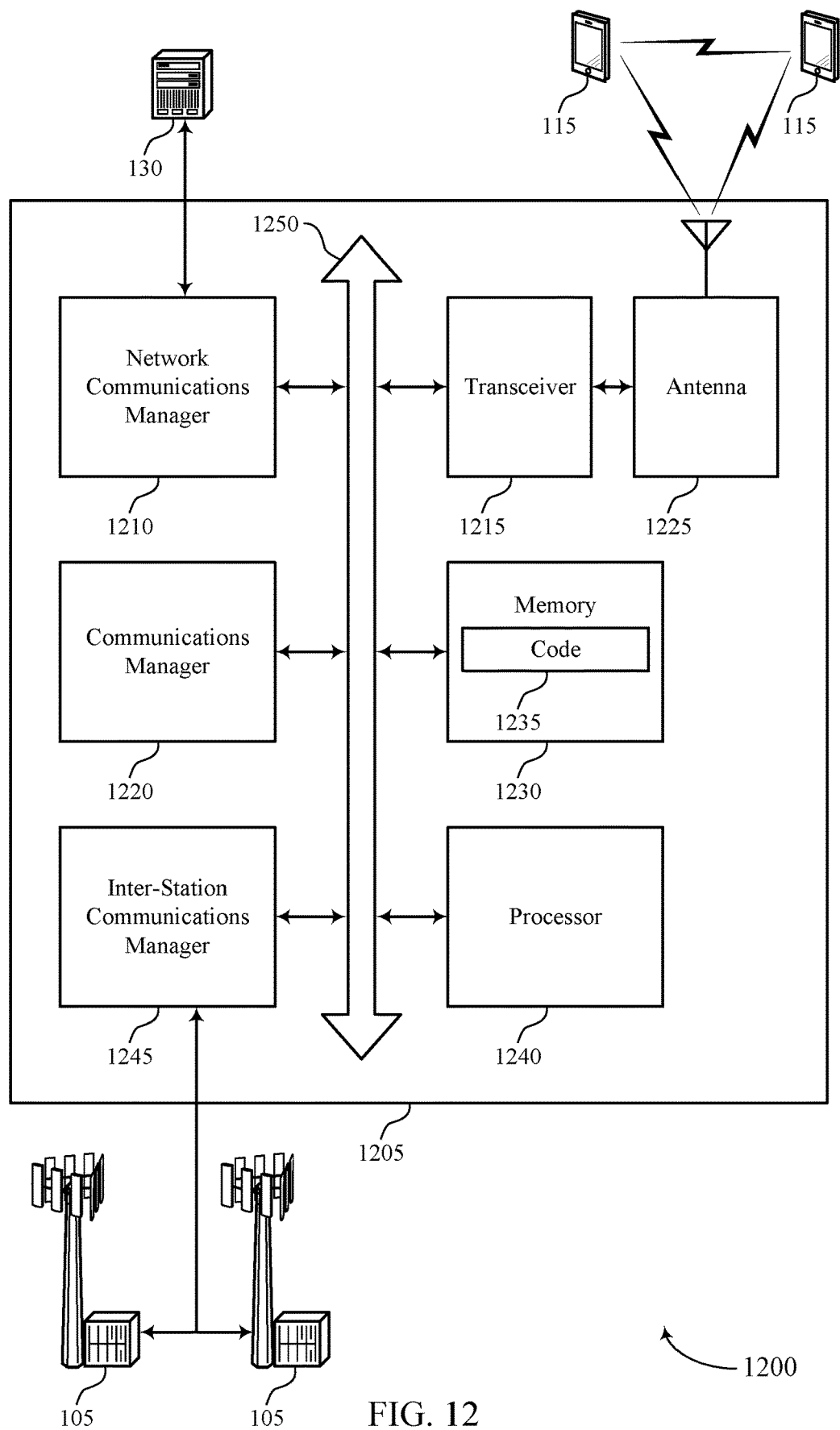
FIG. 12 shows a diagram of a system including a device that supports techniques for measurement gap configurations in accordance with aspects of the present disclosure.

FIG. 12 shows a diagram of a system 1200 including a device 1205 that supports techniques for measurement gap configurations in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for measurement gap configurations). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, control signaling including an indication of a first measurement gap configuration associated with a first BWP and associated with measurements for communications at the UE over a frequency outside of the first BWP in a frequency domain. The communications manager 1220 may be configured as or otherwise support a means for transmitting, to the UE, a downlink message including an indication of the first BWP. The communications manager 1220 may be configured as or otherwise support a means for communicating with the UE during a first time interval based on the indication of the first measurement gap configuration and the indication of the first BWP.

By including or configuring the communications manager 1220 in accordance with examples as described herein, the device 1205 may support techniques for improve measurement for signals received outside of an active BWP at the UE 115. In particular, by configuring the UE 115 with multiple measurement gap configurations (e.g., on a per-BWP basis), techniques described herein may enable measurement gap configurations to be configured in accordance with one or more measurement object configurations. Configuring the UE 115 with multiple measurement gap configurations may additionally improve throughput at the UE 115 and the base station 105 in cases where measurements need not be performed outside of the active BWP at the UE 115. Moreover, configuring measurement gap configurations on a per-BWP basis may prevent the need for a measurement gap configuration to be re-configured each time the switches between BWPs, which may reduce a latency of measurements performed at the UE 115 and facilitate improved handover decisions at the UE 115.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for measurement gap configurations as described herein, or the processor 1240 and the memory 1230 may be otherwise configured to perform or support such operations.

Figure 13:
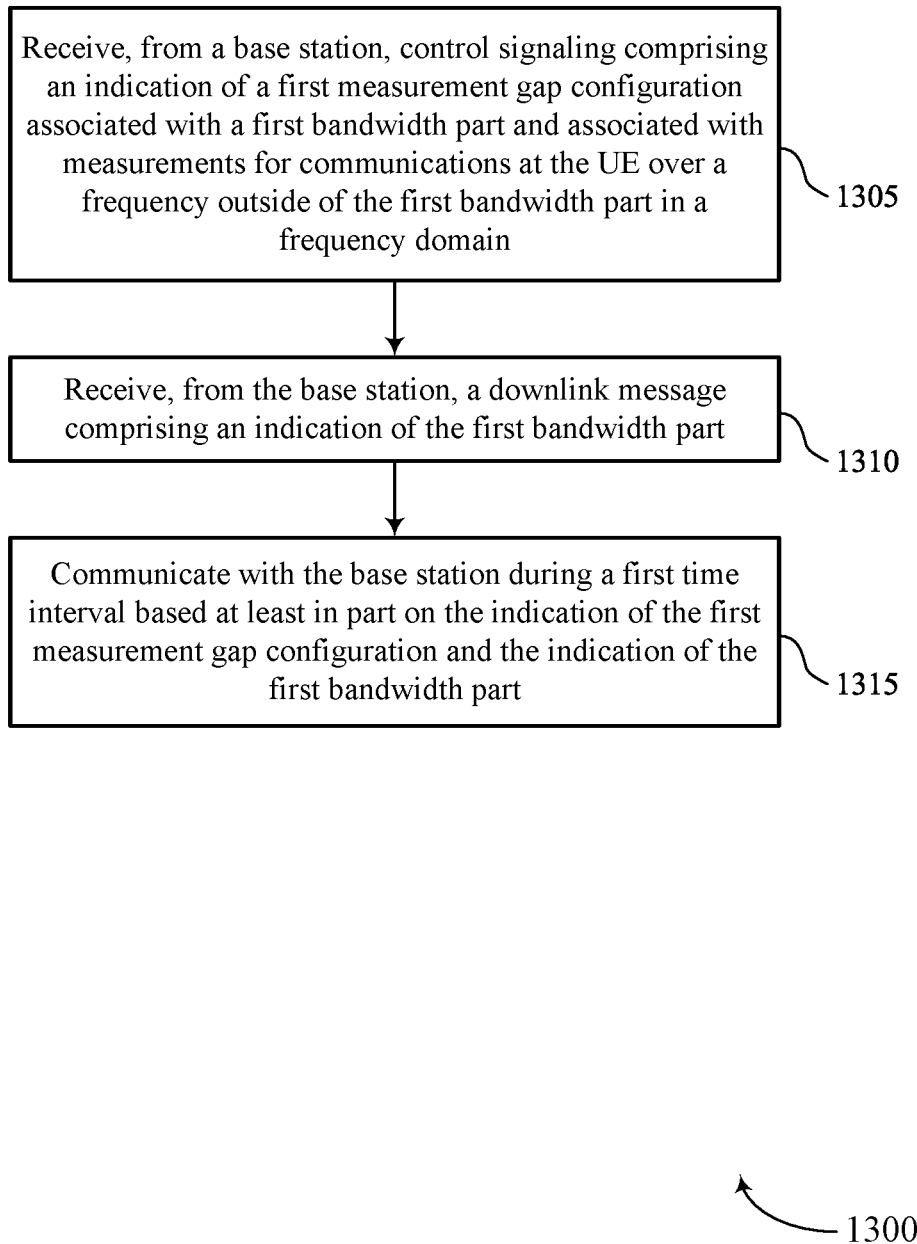
FIGS. 13 through 15 show flowcharts illustrating methods that support techniques for measurement gap configurations in accordance with aspects of the present disclosure.

FIG. 13 shows a flowchart illustrating a method 1300 that supports techniques for measurement gap configurations in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling including an indication of a first measurement gap configuration associated with a first BWP and associated with measurements for communications at the UE over a frequency outside of the first BWP in a frequency domain. The operations of 1305 may be performed in accordance with examples as disclosed herein. In some examples, aspects of the operations of 1305 may be performed by a measurement gap configuration manager 725 as described with reference to FIG. 7.

At 1310, the method may include receiving, from the base station, a downlink message including an indication of the first BWP. The operations of 1310 may be performed in accordance with examples as disclosed herein. In some examples, aspects of the operations of 1310 may be performed by a downlink message receiving manager 730 as described with reference to FIG. 7.

At 1315, the method may include communicating with the base station during a first time interval based on the indication of the first measurement gap configuration and the indication of the first BWP. The operations of 1315 may be performed in accordance with examples as disclosed herein. In some examples, aspects of the operations of 1315 may be performed by a base station communicating manager 735 as described with reference to FIG. 7.

Figure 14:
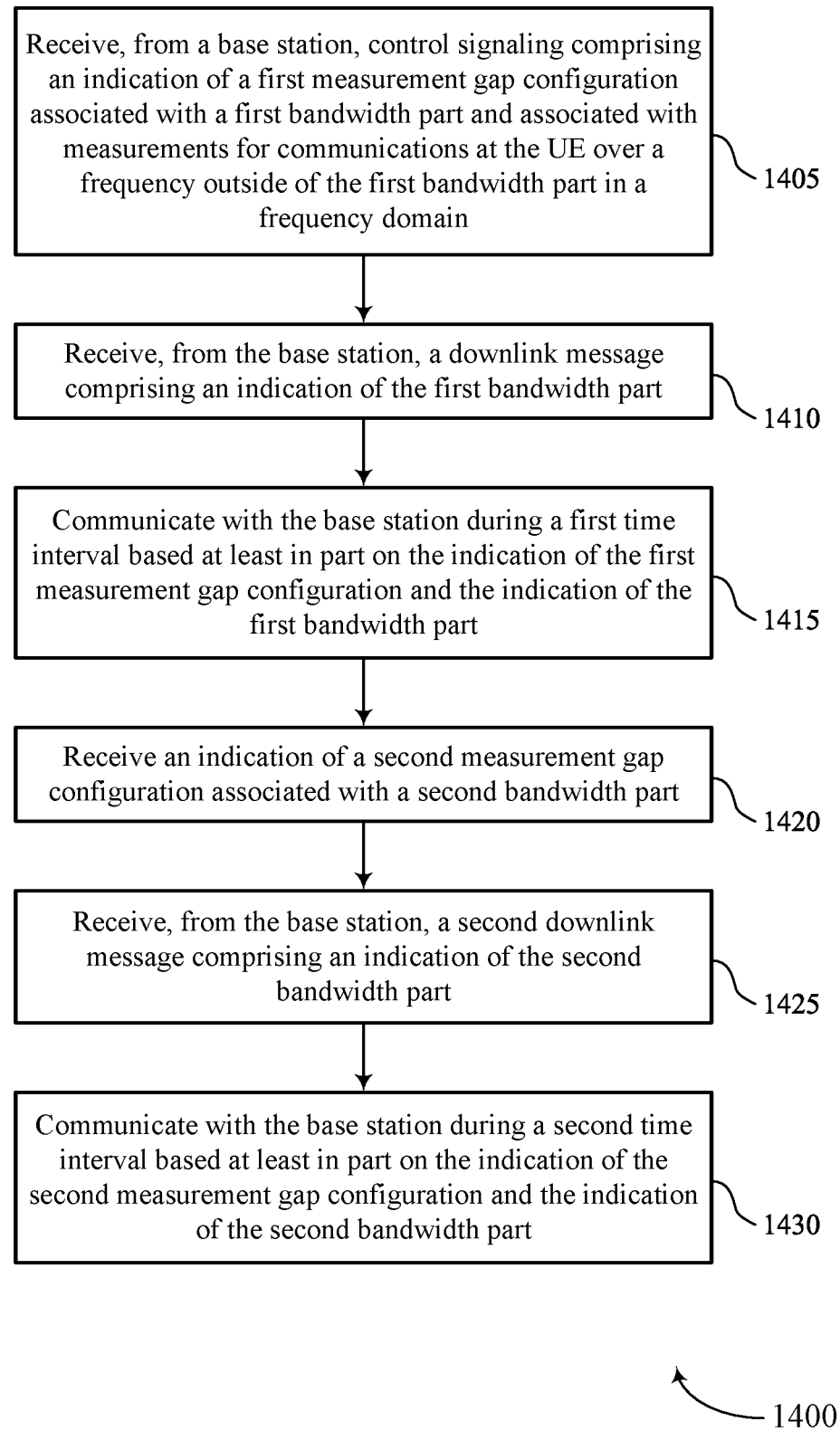

FIG. 14 shows a flowchart illustrating a method 1400 that supports techniques for measurement gap configurations in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling including an indication of a first measurement gap configuration associated with a first BWP and associated with measurements for communications at the UE over a frequency outside of the first BWP in a frequency domain. The operations of 1405 may be performed in accordance with examples as disclosed herein. In some examples, aspects of the operations of 1405 may be performed by a measurement gap configuration manager 725 as described with reference to FIG. 7.

At 1410, the method may include receiving, from the base station, a downlink message including an indication of the first BWP. The operations of 1410 may be performed in accordance with examples as disclosed herein. In some examples, aspects of the operations of 1410 may be performed by a downlink message receiving manager 730 as described with reference to FIG. 7.

At 1415, the method may include communicating with the base station during a first time interval based on the indication of the first measurement gap configuration and the indication of the first BWP. The operations of 1415 may be performed in accordance with examples as disclosed herein. In some examples, aspects of the operations of 1415 may be performed by a base station communicating manager 735 as described with reference to FIG. 7.

At 1420, the method may include receiving an indication of a second measurement gap configuration associated with a second BWP. The operations of 1420 may be performed in accordance with examples as disclosed herein. In some examples, aspects of the operations of 1420 may be performed by a measurement gap configuration manager 725 as described with reference to FIG. 7. In some implementations, the steps/operations at 1410 and 1420 may be performed concurrently (e.g., simultaneously).

At 1425, the method may include receiving, from the base station, a second downlink message including an indication of the second BWP. The operations of 1425 may be performed in accordance with examples as disclosed herein. In some examples, aspects of the operations of 1425 may be performed by a downlink message receiving manager 730 as described with reference to FIG. 7.

At 1430, the method may include communicating with the base station during a second time interval based on the indication of the second measurement gap configuration and the indication of the second BWP. The operations of 1430 may be performed in accordance with examples as disclosed herein. In some examples, aspects of the operations of 1430 may be performed by a base station communicating manager 735 as described with reference to FIG. 7.

Figure 15:
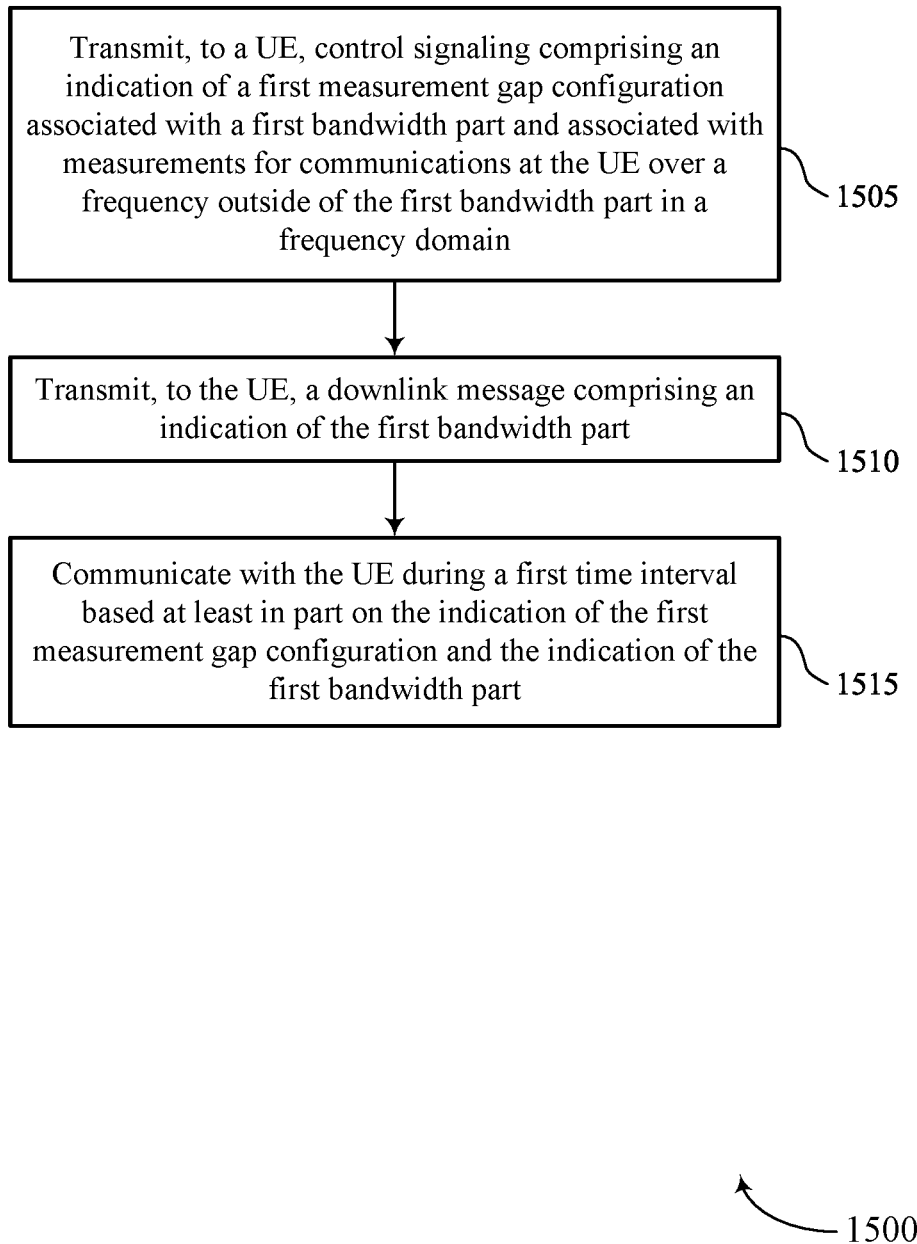

FIG. 15 shows a flowchart illustrating a method 1500 that supports techniques for measurement gap configurations in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling including an indication of a first measurement gap configuration associated with a first BWP and associated with measurements for communications at the UE over a frequency outside of the first BWP in a frequency domain. The operations of 1505 may be performed in accordance with examples as disclosed herein. In some examples, aspects of the operations of 1505 may be performed by a measurement gap configuration manager 1125 as described with reference to FIG. 11.

At 1510, the method may include transmitting, to the UE, a downlink message including an indication of the first BWP. The operations of 1510 may be performed in accordance with examples as disclosed herein. In some examples, aspects of the operations of 1510 may be performed by a downlink message transmitting manager 1130 as described with reference to FIG. 11.

At 1515, the method may include communicating with the UE during a first time interval based on the indication of the first measurement gap configuration and the indication of the first BWP. The operations of 1515 may be performed in accordance with examples as disclosed herein. In some examples, aspects of the operations of 1515 may be performed by a UE communicating manager 1135 as described with reference to FIG. 11.

The following provides an overview of aspects of the present disclosure:

Aspect 1: A method for wireless communication at a UE, comprising: receiving, from a base station, control signaling comprising an indication of a first measurement gap configuration associated with a first BWP and associated with measurements for communications at the UE over a frequency outside of the first BWP in a frequency domain; receiving, from the base station, a downlink message comprising an indication of the first BWP; and communicating with the base station during a first time interval based at least in part on the indication of the first measurement gap configuration and the indication of the first BWP.

Aspect 2: The method of aspect 1, further comprising: receiving an indication of a second measurement gap configuration associated with a second BWP; receiving, from the base station, a second downlink message comprising an indication of the second BWP; and communicating with the base station during a second time interval based at least in part on the indication of the second measurement gap configuration and the indication of the second BWP.

Aspect 3: The method of any of aspects 1 through 2, further comprising: receiving an indication of a measurement object configuration associated with a plurality of measurement occasions for performing measurements at the UE; receiving one or more messages during the plurality of measurement occasions and associated with the frequency; and performing measurements for the one or more messages based at least in part on the first measurement gap configuration, wherein communicating with the base station during the first time interval is based at least in part on performing the measurements.

Aspect 4: The method of aspect 3, further comprising: suspending communications with the base station within the first BWP based at least in part on the first measurement gap configuration; and monitoring the one or more measurement occasions based at least in part on suspending the communications within the first BWP, wherein receiving the one or more messages is based at least in part on the monitoring.

Aspect 5: The method of any of aspects 1 through 4, further comprising: determining an expiration of a timer associated with the first measurement gap configuration, an expiration of a validity period associated with the first measurement gap configuration, or both; and communicating with the base station during a second time interval based at least in part on a modified first measurement gap configuration or a second measurement gap configuration based at least in part on the expiration of the timer, the expiration of the validity period, or both.

Aspect 6: The method of aspect 5, further comprising: receiving, via the control signaling, an indication of the timer, an indication of the validity period or both, wherein determining the expiration of the timer, the expiration of the validity period, or both is based at least in part on the indication of the timer, the validity period, or both.

Aspect 7: The method of any of aspects 5 through 6, further comprising: transmitting, to the base station, an indication of a capability of the UE to perform communications based at least in part on the timer, wherein communicating with the base station during the first time interval based at least in part on the modified first measurement gap configuration or the second measurement gap configuration is based at least in part on the indication of the capability.

Aspect 8: The method of any of aspects 1 through 7, further comprising: receiving, via the control signaling, an indication of a second measurement gap configuration associated with the first BWP; determining to perform communications based at least in part on the first measurement gap configuration or the second measurement gap configuration, wherein communicating with the base station during the first time interval is performed based at least in part on the determined measurement gap configuration.

Aspect 9: The method of aspect 8, further comprising: receiving, via the downlink message, an indication of the first measurement gap configuration or the second measurement gap configuration, wherein determining to perform the communications based at least in part on the first measurement gap configuration or the second measurement gap configuration is based at least in part on the indication of the first measurement gap configuration or the second measurement gap configuration.

Aspect 10: The method of any of aspects 8 through 9, further comprising: transmitting, to the base station, an indication of a capability of the UE to support a plurality of measurement gap configurations associated with the first BWP, wherein receiving the control signaling, receiving the downlink message, communicating with the base station during the first time interval, or any combination thereof, is based at least in part on the indication of the capability.

Aspect 11: The method of any of aspects 1 through 10, wherein the control signaling comprises a RRC message, the method further comprising: receiving, via the RRC message, an indication of a plurality of measurement gap configurations associated with a plurality of BWPs for communications at the UE, wherein the plurality of measurement gap configurations comprise the first measurement gap configuration, and wherein the plurality of BWPs comprise the first BWP.

Aspect 12: The method of aspect 11, wherein each measurement gap configuration of the plurality of measurement gap configurations corresponds to a respective BWP of the plurality of BWPs.

Aspect 13: The method of any of aspects 11 through 12, further comprising: switching from the first BWP to a second BWP; and communicating with the base station during a second time interval based at least in part on switching from the first BWP to the second BWP and based at least in part on a second measurement gap configuration of the plurality of measurement gap configurations that corresponds to the second BWP.

Aspect 14: The method of any of aspects 1 through 13, wherein the downlink message comprises a DCI message, a medium access control-control element message, a RRC message, or any combination thereof.

Aspect 15: The method of any of aspects 1 through 14, further comprising: receiving, via the downlink message, an indication of an activity state associated with the first measurement gap configuration, the activity state comprising one of an active state or an inactive state, wherein communicating with the base station during the first time interval is performed based at least in part on the activity state.

Aspect 16: The method of any of aspects 1 through 15, further comprising: receiving, via the downlink message, an indication of one or more parameters associated with the first measurement gap configuration, wherein communicating with the base station during the first time interval is performed based at least in part on the one or more parameters.

Aspect 17: The method of any of aspects 1 through 16, wherein the control signaling and the downlink message are received via a same downlink communication.

Aspect 18: The method of any of aspects 1 through 17, wherein the first measurement gap configuration comprises a BWP index associated with the first BWP, a periodicity associated with a plurality of measurement gaps, a gap duration associated with the plurality of measurement gaps, a set of serving carriers associated with the first measurement gap configuration, a frequency range associated with the first measurement gap configuration, or any combination thereof.

Aspect 19: The method of any of aspects 1 through 18, further comprising: transmitting, to the base station, an indication of a capability of the UE to perform communications based at least in part on the first measurement gap configuration associated with the first BWP, wherein receiving the control signaling, receiving the downlink message, communicating with the base station during the first time interval, or any combination thereof, is based at least in part on the indication of the capability.

Aspect 20: The method of any of aspects 1 through 19, further comprising: receiving, via the control signaling, an indication of a default activity state associated with the first measurement gap configuration, a second measurement gap configuration, or both, wherein communicating with the base station during the first time interval is based at least in part on the indication of the default activity state.

Aspect 21: A method for wireless communication at a base station, comprising: transmitting, to a UE, control signaling comprising an indication of a first measurement gap configuration associated with a first BWP and associated with measurements for communications at the UE over a frequency outside of the first BWP in a frequency domain; transmitting, to the UE, a downlink message comprising an indication of the first BWP; and communicating with the UE during a first time interval based at least in part on the indication of the first measurement gap configuration and the indication of the first BWP.

Aspect 22: The method of aspect 21, further comprising: transmitting, to the UE, an indication of a second measurement gap configuration associated with a second BWP; transmitting, to the UE, a second downlink message comprising an indication of the second BWP; and communicating with the UE during a second time interval based at least in part on the indication of the second measurement gap configuration and the indication of the second BWP.

Aspect 23: The method of any of aspects 21 through 22, further comprising: transmitting an indication of a measurement object configuration associated with a plurality of measurement occasions for performing measurements at the UE, wherein communicating with the UE during the first time interval is based at least in part on the indication of the measurement object configuration.

Aspect 24: The method of any of aspects 21 through 23, further comprising: determining an expiration of a timer associated with the first measurement gap configuration, an expiration of a validity period associated with the first measurement gap configuration, or both; and communicating with the UE during a second time interval based at least in part on a modified first measurement gap configuration or a second measurement gap configuration based at least in part on the expiration of the timer, the expiration of the validity period, or both.

Aspect 25: The method of aspect 24, further comprising: transmitting, via the control signaling, an indication of the timer, an indication of the validity period or both, wherein determining the expiration of the timer, the expiration of the validity period, or both is based at least in part on the indication of the timer, the validity period, or both.

Aspect 26: The method of any of aspects 24 through 25, further comprising: receiving, from the UE, an indication of a capability of the UE to perform communications based at least in part on the timer, wherein communicating with the UE during the first time interval based at least in part on the modified first measurement gap configuration or the second measurement gap configuration is based at least in part on the indication of the capability.

Aspect 27: The method of any of aspects 21 through 26, further comprising: transmitting, via the control signaling, an indication of a second measurement gap configuration associated with the first BWP; determining to perform communications based at least in part on the first measurement gap configuration or the second measurement gap configuration, wherein communicating with the UE during the first time interval is performed based at least in part on the determined measurement gap configuration.

Aspect 28: The method of aspect 27, further comprising: transmitting, via the downlink message, an indication of the first measurement gap configuration or the second measurement gap configuration, wherein determining to perform the communications based at least in part on the first measurement gap configuration or the second measurement gap configuration is based at least in part on the indication of the first measurement gap configuration or the second measurement gap configuration.

Aspect 29: The method of any of aspects 27 through 28, further comprising: receiving, from the UE, an indication of a capability of the UE to support a plurality of measurement gap configurations associated with the first BWP, wherein transmitting the control signaling, transmitting the downlink message, communicating with the UE during the first time interval, or any combination thereof, is based at least in part on the indication of the capability.

Aspect 30: The method of any of aspects 21 through 29, wherein the control signaling comprises a RRC message, the method further comprising: transmitting, via the RRC message, an indication of a plurality of measurement gap configurations associated with a plurality of BWPs for communications at the UE, wherein the plurality of measurement gap configurations comprise the first measurement gap configuration, and wherein the plurality of BWPs comprise the first BWP.

Aspect 31: The method of any of aspects 21 through 30, wherein the downlink message comprises a DCI message, a medium access control-control element message, a RRC message, or any combination thereof.

Aspect 32: The method of any of aspects 21 through 31, further comprising: transmitting, via the downlink message, an indication of an activity state associated with the first measurement gap configuration, the activity state comprising one of an active state or an inactive state, wherein communicating with the UE during the first time interval is performed based at least in part on the activity state.

Aspect 33: The method of any of aspects 21 through 32, further comprising: transmitting, via the downlink message, an indication of one or more parameters associated with the first measurement gap configuration, wherein communicating with the UE during the first time interval is performed based at least in part on the one or more parameters.

Aspect 34: The method of any of aspects 21 through 33, wherein the control signaling and the downlink message are received via a same downlink communication.

Aspect 35: The method of any of aspects 21 through 34, wherein the first measurement gap configuration comprises a BWP index associated with the first BWP, a periodicity associated with a plurality of measurement gaps, a gap duration associated with the plurality of measurement gaps, a set of serving carriers associated with the first measurement gap configuration, a frequency range associated with the first measurement gap configuration, or any combination thereof.

Aspect 36: The method of any of aspects 21 through 35, further comprising: receiving, from the UE, an indication of a capability of the UE to perform communications based at least in part on the first measurement gap configuration associated with the first BWP, wherein transmitting the control signaling, transmitting the downlink message, communicating with the UE during the first time interval, or any combination thereof, is based at least in part on the indication of the capability.

Aspect 37: The method of any of aspects 21 through 36, further comprising: transmitting, via the control signaling, an indication of a default activity state associated with the first measurement gap configuration, a second measurement gap configuration, or both, wherein communicating with the UE during the first time interval is based at least in part on the indication of the default activity state.

Aspect 38: An apparatus for wireless communication at a UE, comprising a processor; memory coupled with the processor; and instructions stored in the memory and executable by the processor to cause the apparatus to perform a method of any of aspects 1 through 20.

Aspect 39: An apparatus for wireless communication at a UE, comprising at least one means for performing a method of any of aspects 1 through 20.

Aspect 40: A non-transitory computer-readable medium storing code for wireless communication at a UE, the code comprising instructions executable by a processor to perform a method of any of aspects 1 through 20.

Aspect 41: An apparatus for wireless communication at a base station, comprising a processor; memory coupled with the processor; and instructions stored in the memory and executable by the processor to cause the apparatus to perform a method of any of aspects 21 through 37.

Aspect 42: An apparatus for wireless communication at a base station, comprising at least one means for performing a method of any of aspects 21 through 37.

Aspect 43: A non-transitory computer-readable medium storing code for wireless communication at a base station, the code comprising instructions executable by a processor to perform a method of any of aspects 21 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving, from a base station, control signaling comprising an indication of a first measurement gap configuration associated with a first bandwidth part and a measurement object configuration associated with a plurality of measurement occasions for performing measurements at the UE over a frequency outside of the first bandwidth part in a frequency domain;
receiving, from the base station, a downlink message comprising an indication of the first bandwidth part;
receiving one or more messages associated with the frequency during the plurality of measurement occasions;
performing measurements for the one or more messages based at least in part on the first measurement gap configuration; and
communicating with the base station during a first time interval based at least in part on the indication of the first measurement gap configuration and the indication of the first bandwidth part, and based at least in part on the measurements.

2. The method of claim 1, further comprising:
receiving an indication of a second measurement gap configuration associated with a second bandwidth part;
receiving, from the base station, a second downlink message comprising an indication of the second bandwidth part; and
communicating with the base station during a second time interval based at least in part on the indication of the second measurement gap configuration and the indication of the second bandwidth part.

3. The method of claim 1, further comprising:
suspending communications with the base station within the first bandwidth part based at least in part on the first measurement gap configuration; and
monitoring the plurality of measurement occasions based at least in part on suspending the communications within the first bandwidth part, wherein receiving the one or more messages is based at least in part on the monitoring.

4. The method of claim 1, further comprising:
determining an expiration of a timer associated with the first measurement gap configuration, an expiration of a validity period associated with the first measurement gap configuration, or both; and
communicating with the base station during a second time interval based at least in part on a modified first measurement gap configuration or a second measurement gap configuration based at least in part on the expiration of the timer, the expiration of the validity period, or both.

5. The method of claim 4, further comprising:
receiving, via the control signaling, an indication of the timer, an indication of the validity period or both, wherein determining the expiration of the timer, the expiration of the validity period, or both is based at least in part on the indication of the timer, the validity period, or both.

6. The method of claim 4, further comprising:
transmitting, to the base station, an indication of a capability of the UE to perform communications based at least in part on the timer, wherein communicating with the base station during the first time interval based at least in part on the modified first measurement gap configuration or the second measurement gap configuration is based at least in part on the indication of the capability.

7. The method of claim 1, further comprising:
receiving, via the control signaling, an indication of a second measurement gap configuration associated with the first bandwidth part; and
determining to perform communications based at least in part on the first measurement gap configuration or the second measurement gap configuration, wherein communicating with the base station during the first time interval is performed based at least in part on the determined measurement gap configuration.

8. The method of claim 7, further comprising:
receiving, via the downlink message, an indication of the first measurement gap configuration or the second measurement gap configuration, wherein determining to perform the communications based at least in part on the first measurement gap configuration or the second measurement gap configuration is based at least in part on the indication of the first measurement gap configuration or the second measurement gap configuration.

9. The method of claim 7, further comprising:
transmitting, to the base station, an indication of a capability of the UE to support a plurality of measurement gap configurations associated with the first bandwidth part, wherein receiving the control signaling, receiving the downlink message, communicating with the base station during the first time interval, or any combination thereof, is based at least in part on the indication of the capability.

10. The method of claim 1, wherein the control signaling comprises a radio resource control message, the method further comprising:
receiving, via the radio resource control message, an indication of a plurality of measurement gap configurations associated with a plurality of bandwidth parts for communications at the UE, wherein the plurality of measurement gap configurations comprise the first measurement gap configuration, and wherein the plurality of bandwidth parts comprise the first bandwidth part.

11. The method of claim 10, wherein each measurement gap configuration of the plurality of measurement gap configurations corresponds to a respective bandwidth part of the plurality of bandwidth parts.

12. The method of claim 10, further comprising:
switching from the first bandwidth part to a second bandwidth part; and
communicating with the base station during a second time interval based at least in part on switching from the first bandwidth part to the second bandwidth part and based at least in part on a second measurement gap configuration of the plurality of measurement gap configurations that corresponds to the second bandwidth part.

13. The method of claim 1, wherein the downlink message comprises a downlink control information message, a medium access control-control element message, a radio resource control message, or any combination thereof.

14. The method of claim 1, further comprising:
receiving, via the downlink message, an indication of an activity state associated with the first measurement gap configuration, the activity state comprising one of an active state or an inactive state, wherein communicating with the base station during the first time interval is performed based at least in part on the activity state.

15. The method of claim 1, further comprising:
receiving, via the downlink message, an indication of one or more parameters associated with the first measurement gap configuration, wherein communicating with the base station during the first time interval is performed based at least in part on the one or more parameters.

16. The method of claim 1, wherein the control signaling and the downlink message are received via a same downlink communication.

17. The method of claim 1, wherein the first measurement gap configuration comprises a bandwidth part index associated with the first bandwidth part, a periodicity associated with a plurality of measurement gaps, a gap duration associated with the plurality of measurement gaps, a set of serving carriers associated with the first measurement gap configuration, a frequency range associated with the first measurement gap configuration, or any combination thereof.

18. The method of claim 1, further comprising:
transmitting, to the base station, an indication of a capability of the UE to perform communications based at least in part on the first measurement gap configuration associated with the first bandwidth part, wherein receiving the control signaling, receiving the downlink message, communicating with the base station during the first time interval, or any combination thereof, is based at least in part on the indication of the capability.

19. The method of claim 1, further comprising:
receiving, via the control signaling, an indication of a default activity state associated with the first measurement gap configuration, a second measurement gap configuration, or both, wherein communicating with the base station during the first time interval is based at least in part on the indication of the default activity state.

20. A method for wireless communication at a base station, comprising:
transmitting, to a user equipment (UE), control signaling comprising an indication of a first measurement gap configuration associated with a first bandwidth part and a measurement object configuration associated with a plurality of measurement occasions for performing measurements at the UE over a frequency outside of the first bandwidth part in a frequency domain;
transmitting, to the UE, a downlink message comprising an indication of the first bandwidth part; and
communicating with the UE during a first time interval based at least in part on the indication of the first measurement gap configuration and the indication of the first bandwidth part, and based at least in part on the indication of the measurement object configuration.

21. The method of claim 20, further comprising:
transmitting, to the UE, an indication of a second measurement gap configuration associated with a second bandwidth part;
transmitting, to the UE, a second downlink message comprising an indication of the second bandwidth part; and
communicating with the UE during a second time interval based at least in part on the indication of the second measurement gap configuration and the indication of the second bandwidth part.

22. The method of claim 20, further comprising:
determining an expiration of a timer associated with the first measurement gap configuration, an expiration of a validity period associated with the first measurement gap configuration, or both; and
communicating with the UE during a second time interval based at least in part on a modified first measurement gap configuration or a second measurement gap configuration based at least in part on the expiration of the timer, the expiration of the validity period, or both.

23. The method of claim 22, further comprising:
transmitting, via the control signaling, an indication of the timer, an indication of the validity period or both, wherein determining the expiration of the timer, the expiration of the validity period, or both is based at least in part on the indication of the timer, the validity period, or both.

24. The method of claim 22, further comprising:
receiving, from the UE, an indication of a capability of the UE to perform communications based at least in part on the timer, wherein communicating with the UE during the first time interval based at least in part on the modified first measurement gap configuration or the second measurement gap configuration is based at least in part on the indication of the capability.

25. The method of claim 20, further comprising:
transmitting, via the control signaling, an indication of a second measurement gap configuration associated with the first bandwidth part; and
determining to perform communications based at least in part on the first measurement gap configuration or the second measurement gap configuration, wherein communicating with the UE during the first time interval is performed based at least in part on the determined measurement gap configuration.

26. The method of claim 25, further comprising:
transmitting, via the downlink message, an indication of the first measurement gap configuration or the second measurement gap configuration, wherein determining to perform the communications based at least in part on the first measurement gap configuration or the second measurement gap configuration is based at least in part on the indication of the first measurement gap configuration or the second measurement gap configuration.

27. An apparatus for wireless communication at a user equipment (UE), comprising:
a processor;
memory coupled with the processor; and
instructions stored in the memory and executable by the processor to cause the apparatus to:
receive, from a base station, control signaling comprising an indication of a first measurement gap configuration associated with a first bandwidth part and a measurement object configuration associated with a plurality of measurement occasions for performing measurements at the UE over a frequency outside of the first bandwidth part in a frequency domain;
receive, from the base station, a downlink message comprising an indication of the first bandwidth part;
receive one or more messages associated with the frequency during the plurality of measurement occasions;
perform measurements for the one or more messages based at least in part on the first measurement gap configuration; and
communicate with the base station during a first time interval based at least in part on the indication of the first measurement gap configuration and the indication of the first bandwidth part, and based at least in part on the measurements.

28. An apparatus for wireless communication at a base station, comprising:
a processor;
memory coupled with the processor; and
instructions stored in the memory and executable by the processor to cause the apparatus to:
transmit, to a user equipment (UE), control signaling comprising an indication of a first measurement gap configuration associated with a first bandwidth part and a measurement object configuration associated with a plurality of measurement occasions for performing measurements at the UE over a frequency outside of the first bandwidth part in a frequency domain;
transmit, to the UE, a downlink message comprising an indication of the first bandwidth part; and
communicate with the UE during a first time interval based at least in part on the indication of the first measurement gap configuration and the indication of the first bandwidth part, and based at least in part on the indication of the measurement object configuration.

* * * * *